(12) United States Patent
McCullough et al.

(10) Patent No.: US 11,479,352 B2
(45) Date of Patent: Oct. 25, 2022

(54) TAILSITTING BIPLANE AIRCRAFT HAVING A COAXIAL ROTOR SYSTEM

(71) Applicant: Textron Innovations Inc., Providence, RI (US)

(72) Inventors: John Richard McCullough, Weatherford, TX (US); Andrew Thomas Carter, Richland Hills, TX (US); Sung Kyun Kim, Bedford, TX (US); Matthew John Hill, Keller, TX (US); Lynn Francis Eschete, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 381 days.

(21) Appl. No.: 16/879,070

(22) Filed: May 20, 2020

(65) Prior Publication Data

US 2021/0362851 A1   Nov. 25, 2021

(51) Int. Cl.
*B64C 29/02* (2006.01)
*B64C 39/08* (2006.01)
*B64C 27/52* (2006.01)

(52) U.S. Cl.
CPC .............. *B64C 29/02* (2013.01); *B64C 27/52* (2013.01); *B64C 39/08* (2013.01)

(58) Field of Classification Search
CPC ......... B64C 29/02; B64C 39/08; B64C 27/52; B64C 15/12; B64C 11/48
See application file for complete search history.

(56) References Cited

U.S. PATENT DOCUMENTS

| 8,505,846 | B1 | 8/2013 | Sanders |
| 9,963,228 | B2 | 5/2018 | McCullough et al. |
| 10,442,522 | B2 | 10/2019 | Oldroyd et al. |
| 10,597,164 | B2 | 3/2020 | Oldroyd et al. |
| 10,633,087 | B2 | 4/2020 | McCullough et al. |

(Continued)

FOREIGN PATENT DOCUMENTS

| FR | 2758790 A1 | 7/1998 |
| GB | 2483785 B | 4/2017 |

OTHER PUBLICATIONS

ESR; European Patent Office; Oct. 15, 2021.

(Continued)

*Primary Examiner* — Nicholas McFall
*Assistant Examiner* — Terri L Filosi
(74) *Attorney, Agent, or Firm* — Lawrence Youst PLLC

(57) ABSTRACT

An aircraft operable to transition between thrust-borne lift in a VTOL orientation and wing-borne lift in a biplane orientation. The aircraft has an airframe including first and second wings with a fuselage extending therebetween. A propulsion assembly is coupled to the fuselage and includes a counter-rotating coaxial rotor system that is tiltable relative to the fuselage to generate a thrust vector. A flight control system is configured to direct the thrust vector. In the VTOL orientation, the first wing is forward of the fuselage, the second wing is aft of the fuselage and the coaxial rotor system is configured to provide thrust in line with a yaw axis of the aircraft. In the biplane orientation, the first wing is below the fuselage, the second wing is above the fuselage and the coaxial rotor system is configured to provide thrust in line with a roll axis of the aircraft.

19 Claims, 23 Drawing Sheets

(56) References Cited

U.S. PATENT DOCUMENTS

| | | | |
|---|---|---|---|
| 2003/0006339 A1 | 1/2003 | Capanna | |
| 2010/0276545 A1* | 11/2010 | Chavagnac | B64D 27/023 |
| | | | 244/158.9 |
| 2016/0221675 A1* | 8/2016 | Adam | B64C 27/52 |
| 2017/0334548 A1* | 11/2017 | Foskey | B64C 11/26 |
| 2018/0002013 A1* | 1/2018 | McCullough | B64C 39/024 |
| 2018/0101169 A1* | 4/2018 | Applewhite | G05D 1/104 |
| 2019/0127060 A1* | 5/2019 | Heinen | B64C 39/024 |
| 2019/0243385 A1* | 8/2019 | Khoo | G05D 1/0088 |
| 2019/0263513 A1 | 8/2019 | Randall et al. | |
| 2020/0391863 A1 | 12/2020 | Suzuki | |

OTHER PUBLICATIONS

Wagter et. al.; Design, Control and Visual Navigation of the DelftaCopter; Arxiv.org; Cornell University, Ithaca, NY; Sep. 28, 2016.

Deng, Jinghui et al., Aerodynamic Characteristics of Rigid Coaxial Rotor by Wind Tunnel Test and Numerical Calculation; Chinese Journal of Aeronautics; Jan. 6, 2019.

Foley et al., Static Thrust-Vectoring Performance of Nonaxisymmetric Convergent-Divergent Nozzles with Post-exit Yaw Vanes; NASA Technical Paper 3085; NASA; 1991.

European Examination Report; European Patent Office; dated Oct. 27, 2021.

* cited by examiner

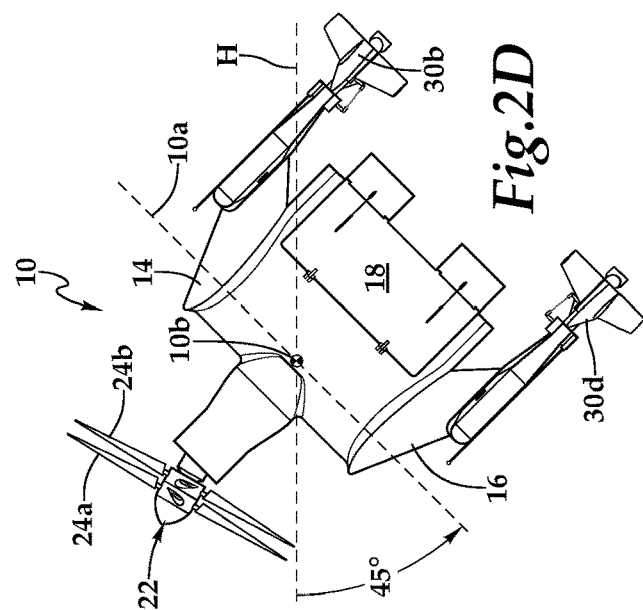
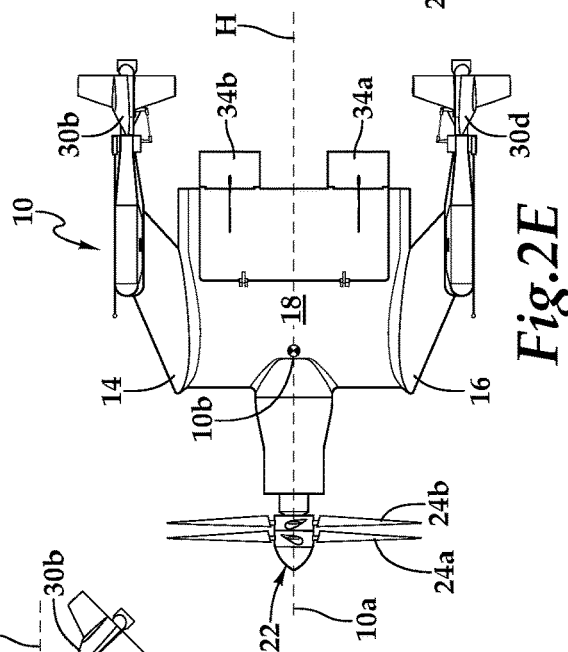
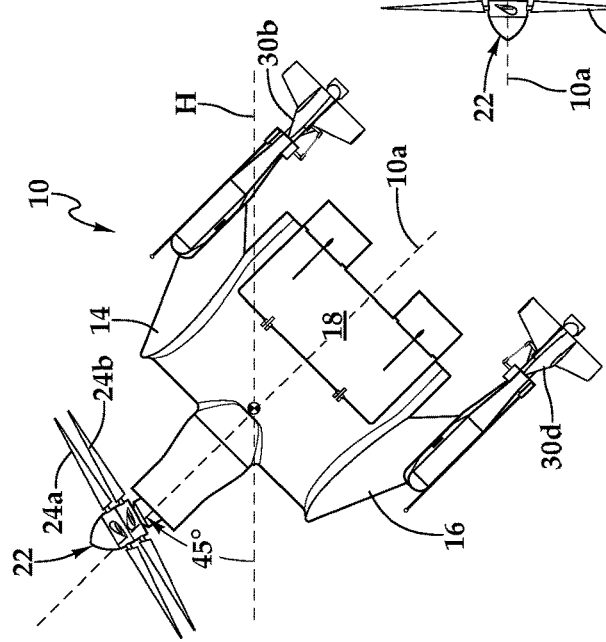

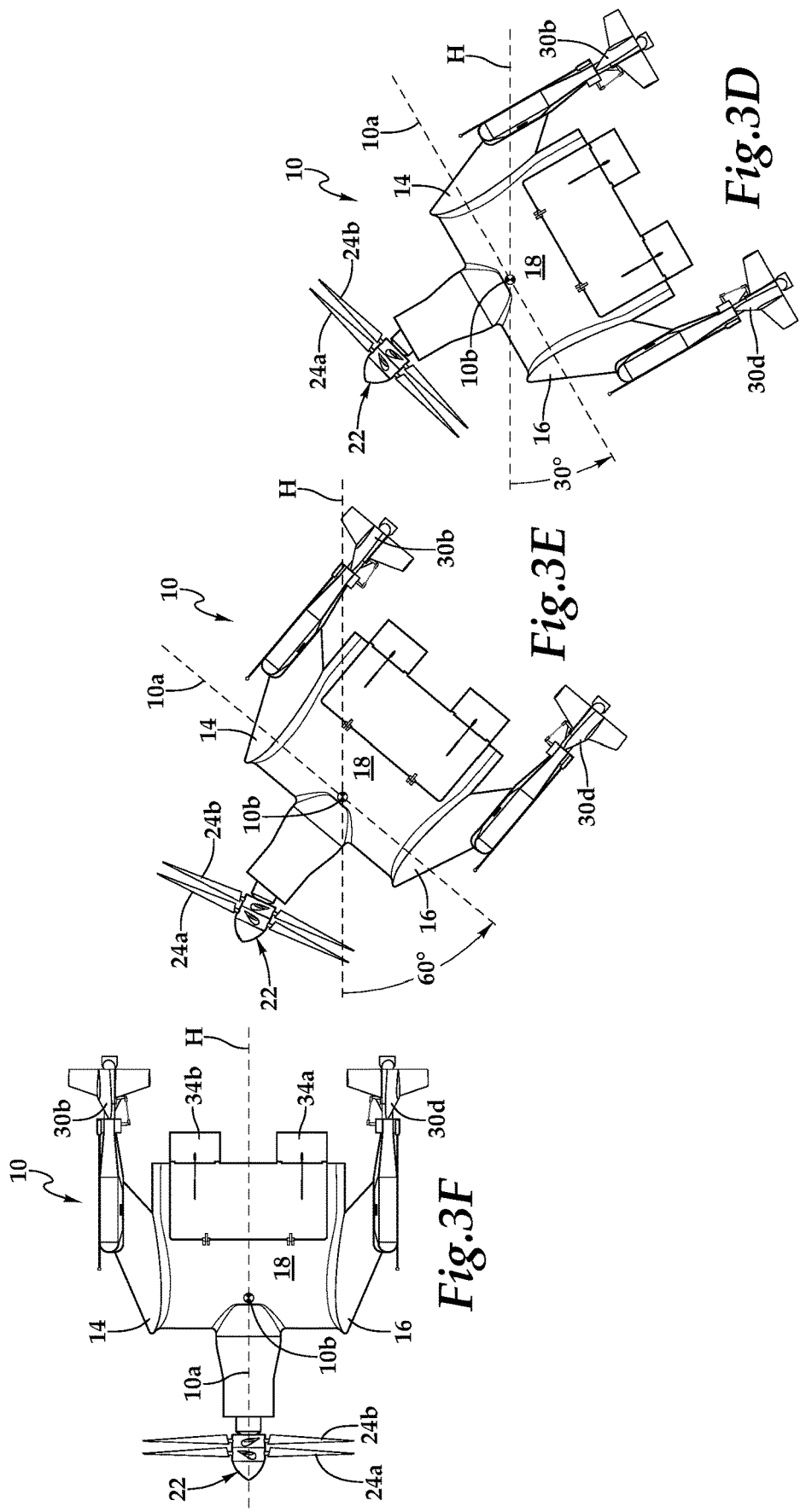

TAILSITTING BIPLANE AIRCRAFT HAVING A COAXIAL ROTOR SYSTEM

TECHNICAL FIELD OF THE DISCLOSURE

The present disclosure relates, in general, to aircraft operable to transition between thrust-borne lift in a VTOL orientation and wing-borne lift in a biplane orientation and, in particular, to a tailsitting biplane aircraft having a counter-rotating coaxial rotor system with thrust vectoring capabilities.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift to the aircraft. The rotors not only enable hovering and vertical takeoff and landing, but also enable forward, backward and lateral flight. These attributes make helicopters highly versatile for use in congested, isolated or remote areas where fixed-wing aircraft may be unable to takeoff and land. Helicopters, however, typically lack the forward airspeed and efficiency of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing. A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically tilted wing provides a large surface area for crosswinds typically requiring tiltwing aircraft to have either cyclic rotor control or an additional thrust station to generate a moment.

SUMMARY

In one aspect, the present disclosure is directed to an aircraft operable to transition between thrust-borne lift in a VTOL orientation and wing-borne lift in a biplane orientation. The aircraft includes an airframe with first and second wings having a fuselage extending therebetween. A propulsion assembly including a counter-rotating coaxial rotor system and at least one motor is coupled to the fuselage. The coaxial rotor system is tiltable relative to the fuselage to generate a thrust vector. A flight control system is configured to direct the thrust vector of the coaxial rotor system. In the VTOL orientation, the first wing is forward of the fuselage, the second wing is aft of the fuselage and the coaxial rotor system is configured to provide thrust in line with a yaw axis of the aircraft. In the biplane orientation, the first wing is below the fuselage, the second wing is above the fuselage and the coaxial rotor system is configured to provide thrust in line with a roll axis of the aircraft.

In some embodiments, in the biplane orientation, the first wing may have an anhedral configuration and the second wing may have a dihedral configuration. In such embodiments, the first wing may have an anhedral angle between eight degrees and sixteen degrees and the second wing may have a dihedral angle between eight degrees and sixteen degrees. In certain embodiments, each of the wings may be a swept wing. In some embodiments, the fuselage may have a length in a longitudinal direction and each of the wings may have a wingspan such that the ratio of the length to the wingspan is between 1 to 2 and 1 to 3. In certain embodiments, the coaxial rotor system may include first and second rotor assemblies each having at least four rotor blades. In such embodiments, each of the rotor blades may have a root to tip twist between forty degrees and fifty degrees. Alternatively or additionally, in such embodiments, the rotor assemblies may have a diameter and each of the wings may have a wingspan such that the ratio of the diameter to the wingspan is between 1 to 1 and 1 to 3. In some embodiments, the motor may be one or more electric motors.

In certain embodiments, a gimbal assembly may be coupled between the coaxial rotor system to the fuselage. In such embodiments, the gimbal assembly may have first and second pivot axes about which the coaxial rotor system is tilted relative to the fuselage. For example, the first and second pivot axes may be orthogonal pivot axes such as a pitch pivot axis and a lateral pivot axis. Also, in such embodiments, the gimbal assembly may include an inner gimbal ring coupled to the coaxial rotor system, an outer gimbal ring coupled to the inner gimbal ring, an inner gimbal ring actuator configured to tilt the inner gimbal ring about the first pivot axis and an outer gimbal ring actuator configured to tilt the outer gimbal ring about the second pivot axis wherein, the inner and outer gimbal ring actuators may be controlled by the flight control system.

In some embodiments, in the VTOL orientation, the aircraft may have translation authority responsive to the thrust vector. In addition, the aircraft may be configured to convert from the VTOL orientation to the biplane orientation responsive to the thrust vector having a pitch forward component during a climb or during forward translation above a predetermined airspeed. In certain embodiments, that aircraft may include first and second yaw vanes that extend aftwardly from the fuselage such that the yaw vanes differentially provide yaw authority for the aircraft in the VTOL orientation and collectively provide yaw authority for the aircraft in the biplane orientation. In some embodiments, the aircraft may include a plurality of tail assemblies with each tail assembly coupled to one of the wingtips of the first and second wings. The tail assemblies may each include a vertical stabilizer and an elevon with the elevons configured to collectively provide pitch authority and differentially provide roll authority for the aircraft in the biplane orientation. In certain embodiments, the aircraft may include a plurality of batteries, each of which may be coupled to one of the tail assemblies. In some embodiments, the coaxial rotor system may define a rotor disk such that the tail assemblies are outboard of the rotor disk.

In another aspect, the present disclosure is directed to an aircraft operable to transition between thrust-borne lift in a VTOL orientation and wing-borne lift in a biplane orientation. The aircraft includes an airframe with a first wing having wingtips, a second wing having wingtips and a fuselage that extends between the first and second wings. A propulsion assembly is gimbal mounted relative to the fuselage. The propulsion assembly includes a counter-rotating coaxial rotor system and at least one motor. The coaxial rotor system is tiltable relative to the fuselage about first and second pivot axes to generate a thrust vector. First and second yaw vanes extend aftwardly from the fuselage such that the yaw vanes differentially provide yaw authority for the aircraft in the VTOL orientation and collectively provide yaw authority for the aircraft in the biplane orientation. Each of a plurality of tail assemblies is coupled to one of the wingtips. Each tail assembly includes a vertical stabilizer and an elevon such that the elevons collectively provide pitch authority and differentially provide roll authority for the aircraft in the biplane orientation. A flight control system is configured to direct the thrust vector of the coaxial rotor system and control movements of the yaw vanes and the elevons. In the VTOL orientation, the first wing is forward of the fuselage, the second wing is aft of the fuselage and the coaxial rotor system is configured to provide thrust in line with a yaw axis of the aircraft. In the biplane orientation, the first wing is below the fuselage, the second wing is above the fuselage and the coaxial rotor system is configured to provide thrust in line with a roll axis of the aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2I are schematic illustrations of a tailsitting biplane aircraft having a coaxial rotor system in a sequential flight operating scenario in accordance with embodiments of the present disclosure;

FIGS. 3A-3F are schematic illustrations of a tailsitting biplane aircraft having a coaxial rotor system in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
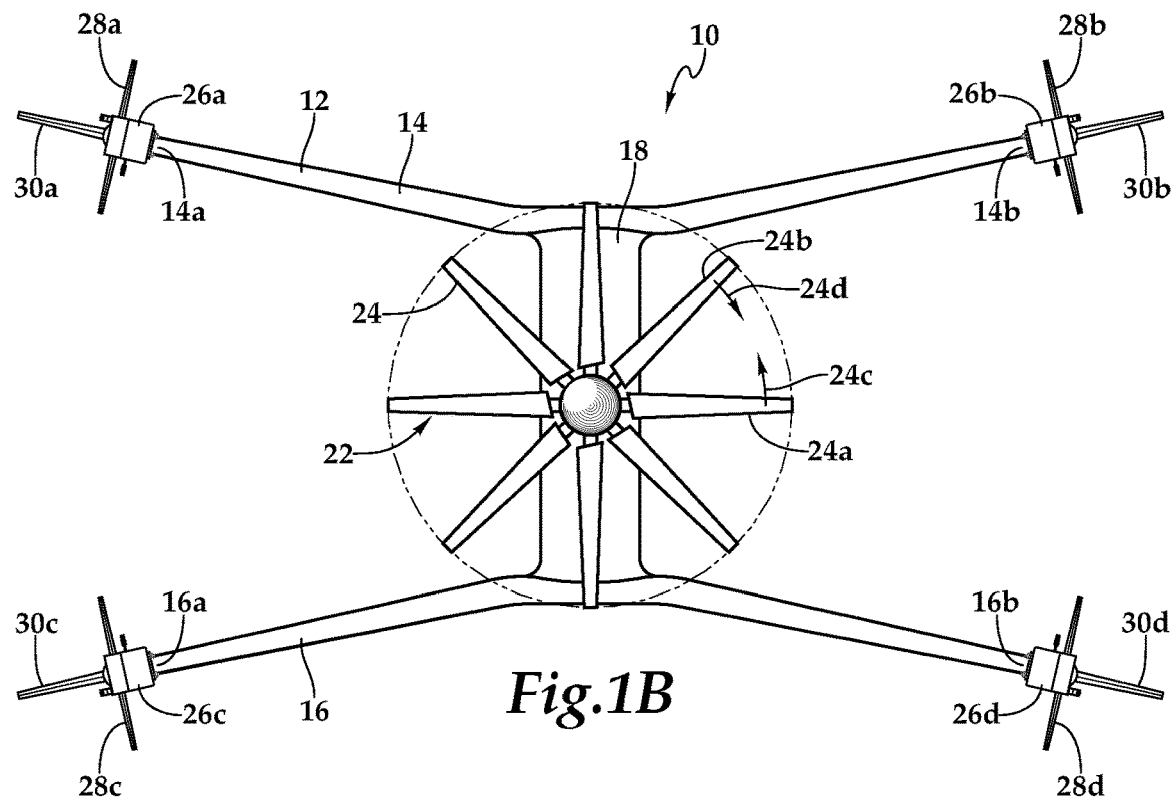
FIGS. 1A-1G are schematic illustrations of a tailsitting biplane aircraft having a coaxial rotor system in accordance with embodiments of the present disclosure.
Figure 1A:
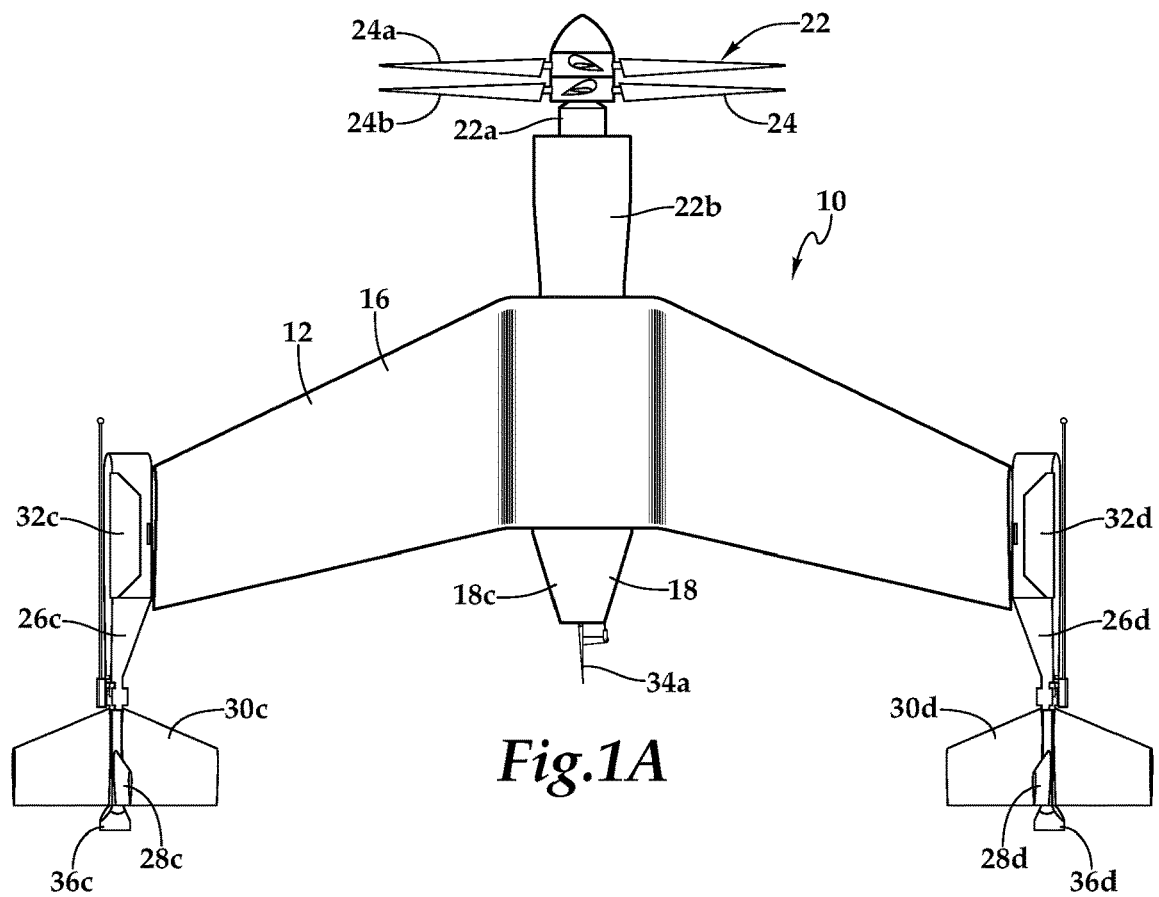
Figure 1D:
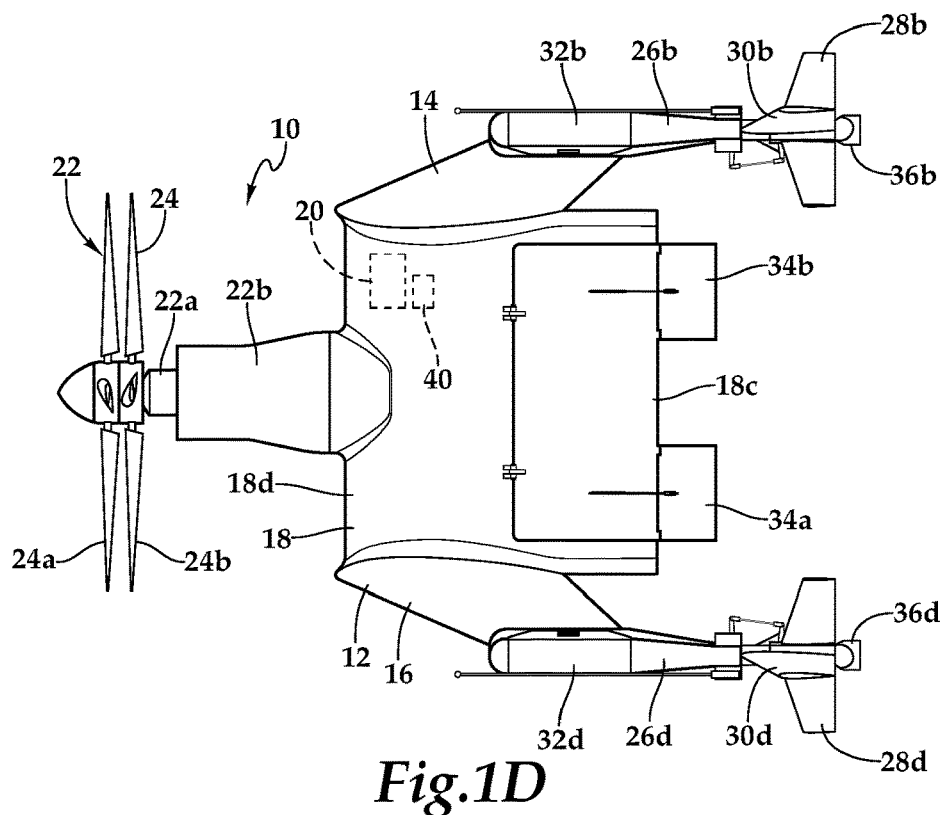
Figure 1C:
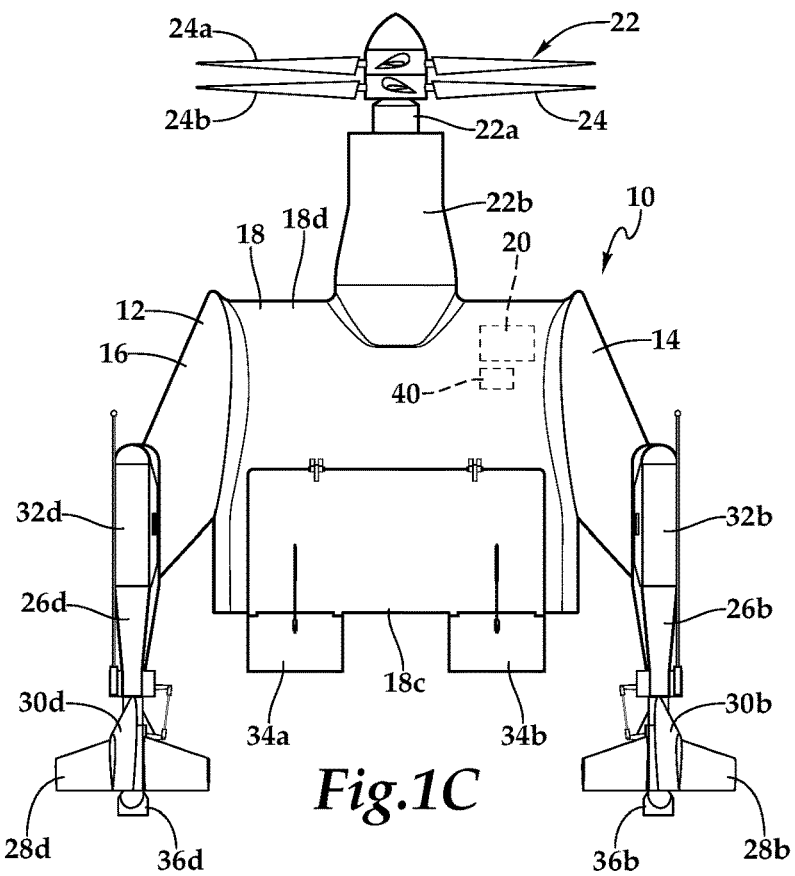
Figure 1F:
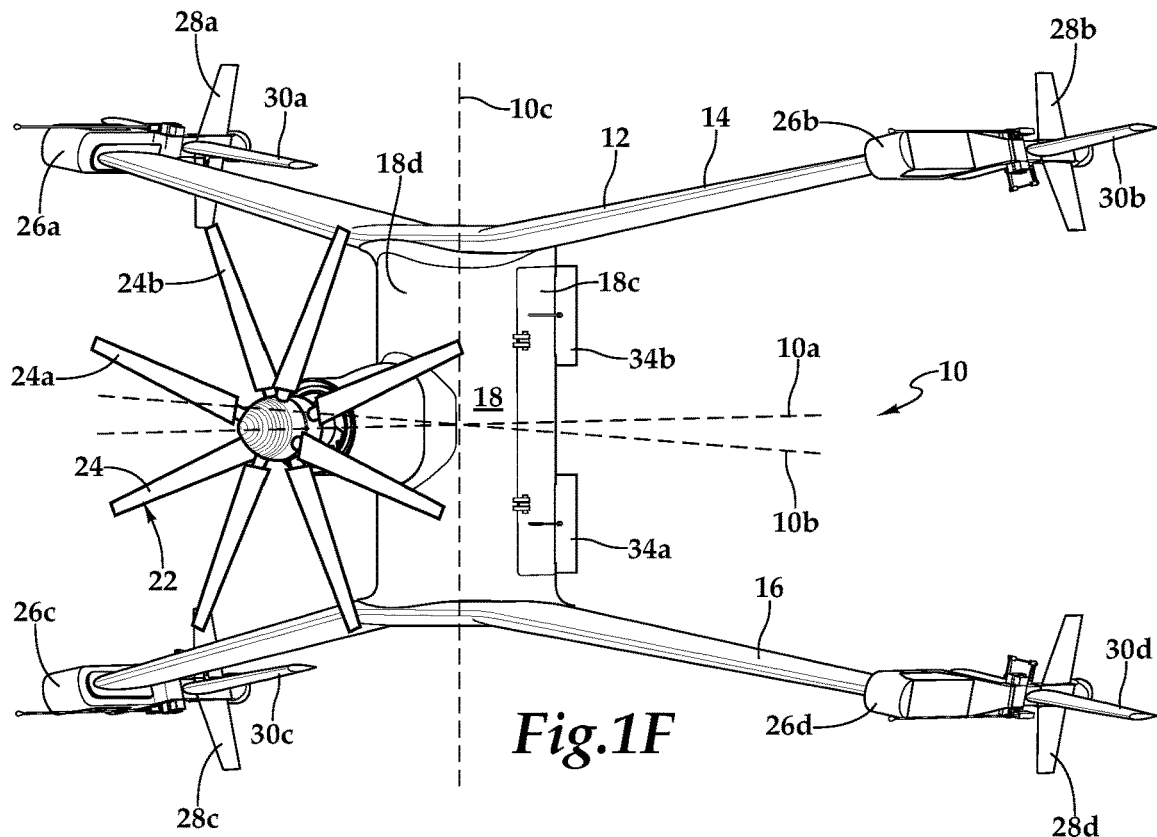
Figure 1E:
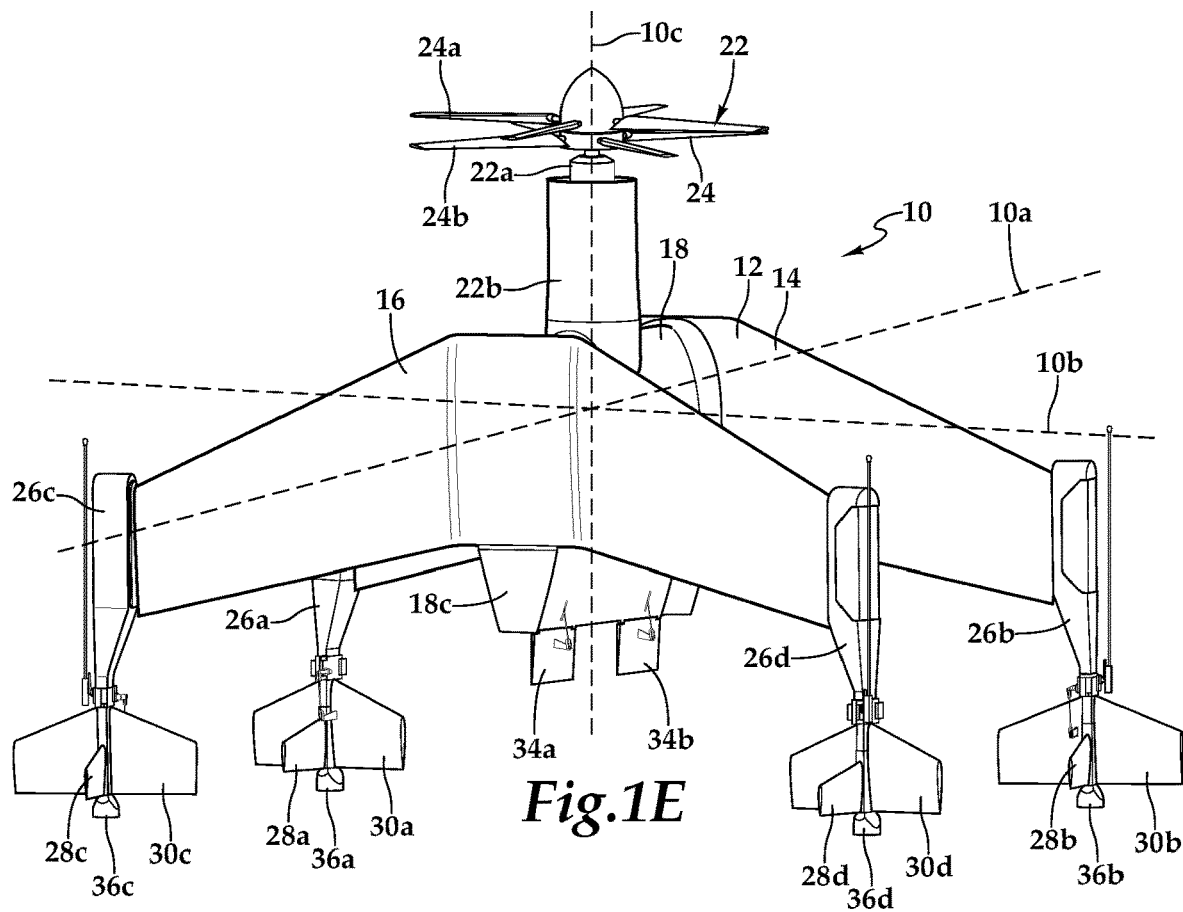

Referring to FIGS. 1A-1G in the drawings, a tailsitting biplane aircraft operable to transition between thrust-borne lift in a VTOL orientation and wing-borne lift in a biplane orientation is schematically illustrated and generally designated as aircraft 10. FIGS. 1A, 1C and 1E depict aircraft 10 in the VTOL orientation wherein the propulsion assembly provides thrust-borne lift enabling aircraft 10 to accomplish vertical takeoffs, hover and vertical landings. FIGS. 1B, 1D and 1F depict aircraft 10 in the biplane orientation wherein the propulsion assembly provides forward thrust with the forward airspeed of aircraft 10 providing wing-borne lift enabling aircraft 10 to have a high speed, high efficiency and/or high endurance forward flight mode. Aircraft 10 has a longitudinal axis 10a that may be referred to as the roll axis, a lateral axis 10b that may be referred to as the pitch axis and a vertical axis 10c that may be referred to as the yaw axis, as best seen in FIGS. 1E and 1F. When longitudinal axis 10a and lateral axis 10b are both in a horizontal plane and normal to the local vertical in the earth's reference frame, aircraft 10 has a level flight attitude.

In the illustrated embodiment, aircraft 10 has an airframe 12 including wings 14, 16 each having an airfoil cross-section that generates lift responsive to the forward airspeed of aircraft 10, in the biplane orientation. Wings 14, 16 may be formed as single members or may be formed from multiple wing sections. The outer skins of wings 14, 16 are preferably formed from high strength and lightweight materials such as fiberglass, carbon, plastic, metal or other suitable material or combination of materials. As best seen in FIG. 1B, wing 14 has a dihedral configuration and wing 16 has an anhedral configuration. In the illustrated embodiment, wing 14 has a dihedral angle of about twelve degrees and wing 16 has an anhedral angle of about twelve degrees. In other embodiments, wing 14 may have a dihedral angle of between eight degrees and sixteen degrees or another suitable dihedral angle. Likewise, wing 16 may have an anhedral angle between eight degrees and sixteen degrees or other suitable anhedral angle. The dihedral and anhedral configuration of wings 14, 16 provide enhanced ground stability of aircraft 10, while the dual wing design provides a compact footprint on the ground.

As best seen in FIG. 1E, wings 14, 16 have swept wing designs. In the illustrated embodiment, wings 14, 16 have a quarter chord sweep angle between fifteen degrees and thirty degrees such as a quarter chord sweep angle between twenty degrees and twenty-five degrees or a quarter chord sweep angle of about twenty-two degrees. In the illustrated embodiment, the leading edge sweep angle is greater than the quarter chord sweep angle and is about twenty-five degrees, the half chord sweep angle is less than the quarter chord sweep angle and is about nineteen degrees and the trailing edge sweep angle is less than the half chord sweep angle and is about twelve and half degrees. As illustrated, the sweep angle progressively decreases from the leading edge to the trailing edge forming a tapered swept wing design. In other embodiments, the sweep angle may remain constant from the leading edge to the trailing edge forming a simple swept wing design, the leading edge may have a sweep angle and the trailing edge may not have a sweep angle forming a delta swept wing design or the leading edge may have a positive sweep angle and the trailing edge may have a negative sweep angle forming a trapezoidal swept wing design.

Figure 1G:
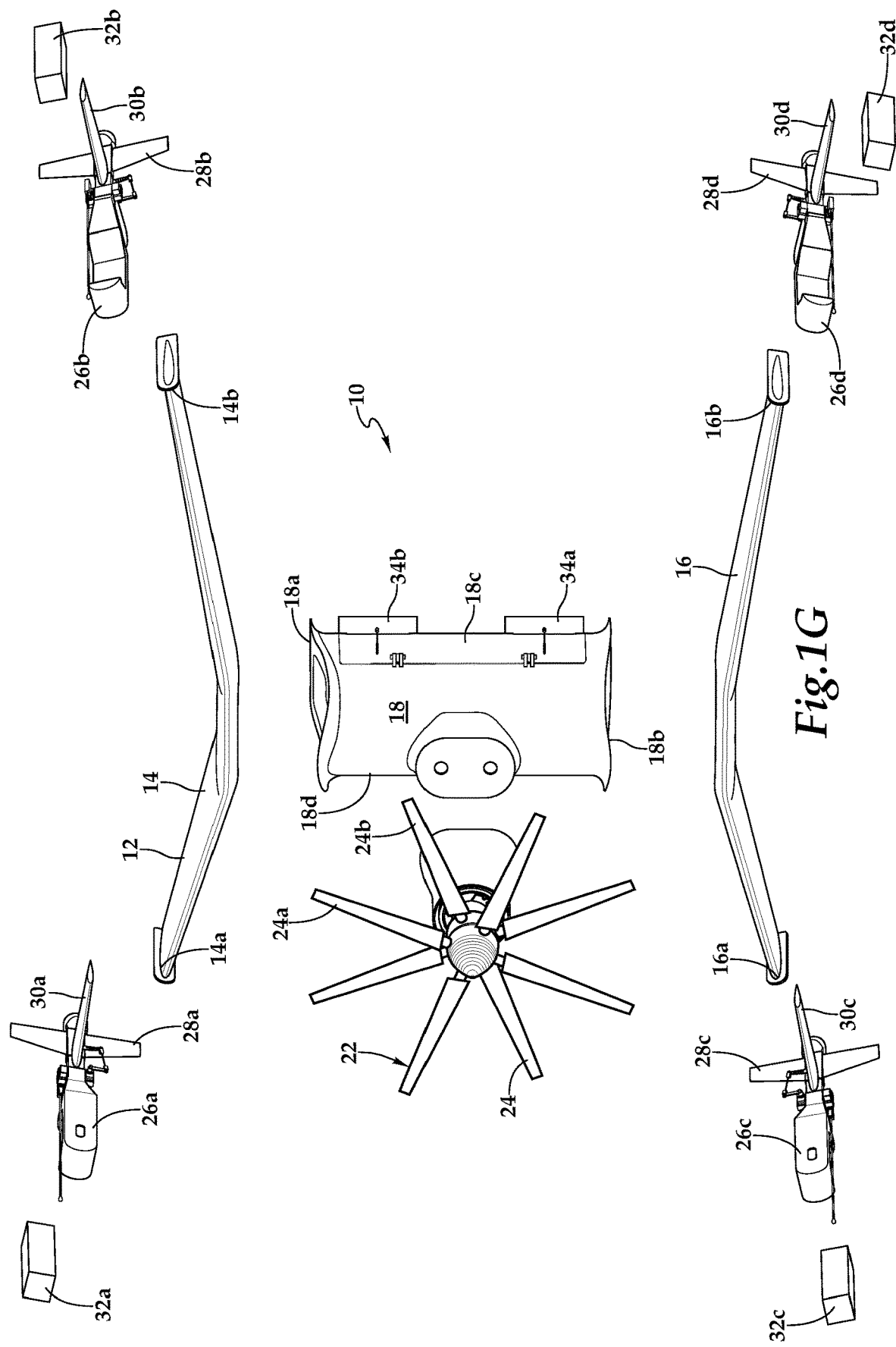

Airframe 12 also includes a fuselage 18 that extends generally perpendicularly between wings 14, 16. Fuselage 18 is preferably formed from high strength and lightweight materials such as fiberglass, carbon, plastic, metal or other suitable material or combination of materials. As best seen in FIG. 1G, fuselage 18 has an aerodynamic shape to minimize drag during high speed forward flight. In addition, fuselage 18 preferably has a length in the longitudinal direction configured to minimize interference drag between wings 14, 16. For example, the longitudinal length of fuselage 18 may have a ratio to the wingspan of wings 14, 16 of between 1 to 2 and 1 to 3 such as a ratio of about 1 to 2.5. Fuselage 18 has an upper flange 18a configured to receive wing 14 and a lower flange 18b configured to receive wing 16. In the illustrated embodiment, wing 14 is aft of fuselage 18 and wing 16 is forward of fuselage 18 in the VTOL orientation and wing 14 is above fuselage 18 and wing 16 is below fuselage 18 in the biplane orientation. Wings 14, 16 may be attachable to and detachable from fuselage 18 and may be standardized and/or interchangeable units and preferably line replaceable units providing easy installation and removal from fuselage 18. The use of line replaceable wings is beneficial in maintenance situations if a fault is discovered with a wing. In this case, the faulty wing can be decoupled from fuselage 18 by simple operations and another wing can then be attached to fuselage 18. In other embodiments, wings 14, 16 may be permanently coupled to fuselage 18. In either case, the connections between wings 14, 16 and fuselage 18 are preferably stiff connections. In the illustrated embodiment, fuselage 18 includes an aft door 18c that is pivotably coupled to main body 18d of fuselage 18. Aft door 18c may be rotated relative to main body 18d to allow access to the inside of fuselage 18, for cargo, passengers, crew or the like. During flight operations, aft door 18c is secured to main body 18d to prevent relative rotation therebetween. Operation of aft door 18c between the open and closed positions may be manual or automated. In other embodiments, an aft door for fuselage 18 may be formed from a pair of clamshell doors each of which is rotatable relative to main body 18d to allow access to the inside of fuselage 18.

As best seen in FIGS. 1C and 1D, fuselage 18 houses a flight control system 20 of aircraft 10. Flight control system 20 is preferably a redundant digital flight control system including multiple independent flight control computers. For example, the use of a triply redundant flight control system 20 improves the overall safety and reliability of aircraft 10 in the event of a failure in flight control system 20. Flight control system 20 preferably includes non-transitory computer readable storage media including a set of computer instructions executable by one or more processors for controlling the operation of aircraft 10. Flight control system 20 may be implemented on one or more general-purpose computers, one or more special purpose computers or other machines with memory and processing capability. For example, flight control system 20 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 20 may be a microprocessor-based system operable to execute program code in the form of machine-executable instructions. In addition, flight control system 20 may be selectively connectable to other computer systems via a proprietary encrypted network, a public encrypted network, the Internet or other suitable communication network that may include both wired and wireless connections.

Aircraft 10 includes a propulsion assembly 22 that is coupled to fuselage 18. Propulsion assemblies such as propulsion assembly 22 may be attachable to and detachable from fuselage 18 and may be standardized and/or interchangeable units and preferably line replaceable units providing easy installation and removal from fuselage 18. The use of line replaceable propulsion assemblies is beneficial in maintenance situations if a fault is discovered with a propulsion assembly. In this case, the faulty propulsion assembly can be decoupled from fuselage 18 by simple operations and another propulsion assembly can then be attached to fuselage 18. In the illustrated embodiment, propulsion assembly 22 includes a counter-rotating coaxial rotor system 24 that has first and second rotors assemblies 24a, 24b that share a common axis of rotation and counter-rotate relative to one another. First and second rotors assemblies 24a, 24b may be referred to as upper rotor assembly 24a and lower rotor assembly 24b in the VTOL orientation of aircraft 10 and as forward rotor assembly 24a and aft rotor assembly 24b in the biplane orientation of aircraft 10.

In the VTOL orientation of aircraft 10, when coaxial rotor system 24 is not thrust vectoring, upper rotor assembly 24a and lower rotor assembly 24b rotate about yaw or vertical axis 10c, as best seen in FIG. 1E, providing thrust in line with the center of gravity of aircraft 10 and in line with yaw axis 10c. In the biplane orientation of aircraft 10, when coaxial rotor system 24 is not thrust vectoring, forward rotor assembly 24a and aft rotor assembly 24b rotate about roll or longitudinal axis 10a, as best seen in FIG. 1F, providing thrust in line with the center of gravity of aircraft 10 and in line with roll axis 10a. In the illustrated embodiment, rotors assemblies 24a, 24b are rigid rotor systems and/or hingeless rotor systems. In other embodiments, rotors assemblies 24a, 24b could have alternate rotor system designs such as fully or partially articulated rotor systems. As illustrated in FIG. 1E, in the VTOL orientation, yaw axis 10c extends through fuselage 18 and propulsion assembly 22 and may be referred to as VTOL yaw axis 10c. Likewise, roll axis 10a extends through fuselage 18 and wings 14, 16 and may be referred to as VTOL roll axis 10a. As illustrated in FIG. 1F, in the biplane orientation, yaw axis 10c extends through fuselage 18 and wings 14, 16 and may be referred to as biplane yaw axis 10c. Likewise, roll axis 10a extends through fuselage 18 and propulsion assembly 22 and may be referred to as biplane roll axis 10a.

As best seen in FIG. 1B, forward rotor assembly 24a has four rotor blades and aft rotor assembly 24b has four rotor blades with forward rotor assembly 24a rotating counter-clockwise, as indicated by arrow 24c, and with aft rotor assembly 24b rotating clockwise, as indicated by arrow 24d, when aircraft 10 is viewed from the front. In the illustrated embodiment, each rotor blade has a root to tip twist between forty degrees and fifty degrees such as a root to tip twist between forty-five degrees and forty-eight degrees or a root to tip twist of about forty-seven degrees. Forward rotor assembly 24a and aft rotor assembly 24b may have the same or similar diameters or may have different diameters such as forward rotor assembly 24a having a larger diameter than aft rotor assembly 24b. In the illustrated embodiment, the rotor disk of coaxial rotor system 24 has a ratio to the wingspan of wings 14, 16 of between 1 to 1 and 1 to 3 such as a ratio of about 1 to 2.5. In other embodiments, the rotor disk of coaxial rotor system 24 could have a ratio to the wingspan of wings 14, 16 of greater than 1 to 1 or less than 1 to 3.

In the illustrated embodiment, aircraft 10 is an electric vertical takeoff and landing (eVTOL) aircraft having two electric motors depicted as a motor assembly 22a, with each of the electric motors driving one of forward rotor assembly 24a and aft rotor assembly 24b. In other embodiments, aircraft 10 may have a single electric motor driving both forward rotor assemblies 24a, 24b or may have one or more internal combustion engines driving rotor assemblies 24a, 24b via one or more suitable transmissions. In the illustrated embodiment, forward rotor assembly 24a and aft rotor assembly 24b are independently controllable rotor assemblies configured for independent variable speed control and independent collective pitch control with no cyclic pitch control. In other embodiments, rotor assemblies 24a, 24b could operate at a constant speed, could have fixed pitch rotor blades and/or could have cyclic pitch control. In the illustrated embodiment, propulsion assembly 22 including coaxial rotor system 24 and motor assembly 22a is tiltable relative to fuselage 18 to provide omnidirectional thrust vectoring capability to aircraft 10 with the counter rotation of rotor assemblies 24a, 24b cancelling the gyroscopic moments. For example, propulsion assembly 22 may be gimbal mounted to fuselage 18 via propulsion assembly housing 22b, which is part of airframe 12, such that coaxial rotor system 24 and motor assembly 22a tilt about orthogonal pivot axes such as a pitch pivot axis and a lateral pivot axis. In other embodiments, propulsion assembly 22 may be gimbal mounted to fuselage 18 such that coaxial rotor system 24 tilts about two non-orthogonal pivot axes or such that coaxial rotor system 24 tilts about only one pivot axis such as the pitch pivot axis. In still other embodiments, coaxial rotor system 24 may be tiltable relative to fuselage 18 with motor assembly 22a being non-tiltable.

Aircraft 10 has a distributed array of control surfaces carried by tail assemblies 26a, 26b, 26c, 26d, which may collectively be referred to as tail assemblies 26. In the illustrated embodiment, tail assemblies 26a, 26b are respectively coupled to wingtips 14a, 14b of wing 14 and tail assemblies 26c, 26d are respectively coupled to wingtips 16a, 16b of wing 16 such that tail assemblies 26a, 26b, 26c, 26d are positioned outboard of the rotor disk of coaxial rotor system 24. Tail assemblies 26 may be independently attachable to and detachable from the wingtips and may be standardized and/or interchangeable units and preferably line replaceable units providing easy installation and removal from the wingtips. The use of line replaceable tail assemblies is beneficial in maintenance situations if a fault is discovered with one of the tail assemblies. In this case, the faulty tail assembly can be decoupled from the wingtip by simple operations and another tail assembly can then be attached to the wingtip. In other embodiments, tail assemblies 26 may be permanently coupled to wings 14, 16.

Tail assembly 26a includes a pair of aerosurfaces depicted as a vertical stabilizer 28a and an elevon 30a. Tail assembly 26b includes a pair of aerosurfaces depicted as a vertical stabilizer 28b and an elevon 30b. Tail assembly 26c includes a pair of aerosurfaces depicted as a vertical stabilizer 28c and an elevon 30c. Tail assembly 26d includes a pair of aerosurfaces depicted as a vertical stabilizer 28d and an elevon 30d. Vertical stabilizers 28a, 28b, 28c, 28d may collectively be referred to as vertical stabilizers 28 and elevons 30a, 30b, 30c, 30d may collectively be referred to as elevons 30. In the illustrated embodiment, vertical stabilizers 28 are fixed aerosurfaces. In other embodiments, vertical stabilizers 28 could operate as rudders. In the illustrated embodiment, elevons 30 are pivoting aerosurfaces that are rotatable about respective elevon axes that may be generally parallel with wings 14, 16 at the respective dihedral and anhedral angles. When operated collectively, elevons 30 serve as elevators to control the pitch or angle of attack of aircraft 10, in the biplane orientation. When operated differentially, elevons 30 serve as ailerons to control the roll or bank of aircraft 10, in the biplane orientation.

Aircraft 10 includes a plurality of electrical power sources depicted as batteries 32a, 32b, 32c, 32d, which may collectively be referred to as batteries 32. In the illustrated embodiment, batteries 32 form a distributed power system in which each battery 32a, 32b, 32c, 32d is located in a receiving pocket of one of the tail assemblies 26a, 26b, 26c, 26d such that batteries 32 provide inertial relief to wings 14, 16. Batteries 32 provide power to flight control system 20, propulsion assembly 22 and other power consumers via a power management system including, for example, a centralized DC bus. Alternatively or additionally, batteries may be housed within fuselage 18 and/or wings 14, 16. In some embodiments, aircraft 10 may have a hybrid power system that includes one or more internal combustion engines and an electric generator. Preferably, the electric generator is used to charge batteries 32. In other embodiments, the electric generator may provide power directly to the power management system and/or the power consumers such as propulsion assembly 22. In still other embodiments, aircraft 10 may use fuel cells as the electrical power sources. The fuel cell may be located in the receiving pockets of tail assemblies 26, in fuselage 18 and/or in wings 14, 16.

Aircraft 10 includes a pair of yaw vanes 34a, 34b that are pivotably coupled to an aft end of fuselage 18. Yaw vanes 34a, 34b may be operated differentially to generate yaw moments when aircraft 10 is in the VTOL orientation and may be operated collectively to generate yaw moments when aircraft 10 is in the biplane orientation. Aircraft 10 has a plurality of landing gear assemblies 36a, 36b, 36c, 36d that may collectively be referred to as landing gear assemblies 36. Landing gear assemblies 36a, 36b, 36c, 36d are positioned at the distal end of respective tail assemblies 26a, 26b, 26c, 26d. The landing gear assemblies 36 may be passively operated pneumatic landing struts or actively operated telescoping landing struts. In other embodiments, landing gear assemblies 36 may include wheels that enable aircraft 10 to taxi and perform other ground maneuvers. In such embodiments, landing gear assemblies 36 may provide a passive brake system or may include active brakes such as an electromechanical braking system or a manual braking system to facilitate parking during ground operations.

Aircraft 10 may be a manned or unmanned aircraft. Flight control system 20 may autonomously control some or all aspects of flight operations for aircraft 10. Flight control system 20 is also operable to communicate with remote systems, such as a ground station via a wireless communications protocol. The remote system may be operable to receive flight data from and provide commands to flight control system 20 to enable remote flight control over some or all aspects of flight operations for aircraft 10. The remote flight control and/or autonomous flight control may be augmented or supplanted by onboard pilot flight control during manned missions. Regardless of the input, aircraft 10 preferably utilizes a fly-by-wire system that transmits electronic signals from flight control system 20 to the actuators of controlled systems to control the flight dynamics of aircraft 10 including controlling the movements of elevons 30, yaw vanes 34a, 34b and propulsion assembly 22. Flight control system 20 communicates with the controlled systems via a fly-by-wire communications network within airframe 12. In addition, flight control system 20 receives data from a plurality of sensors 40 such as one or more position sensors, attitude sensors, speed sensors, altitude sensors, heading sensors, environmental sensors, fuel sensors, temperature sensors, location sensors and the like to enhance flight control capabilities.

Figure 2A:
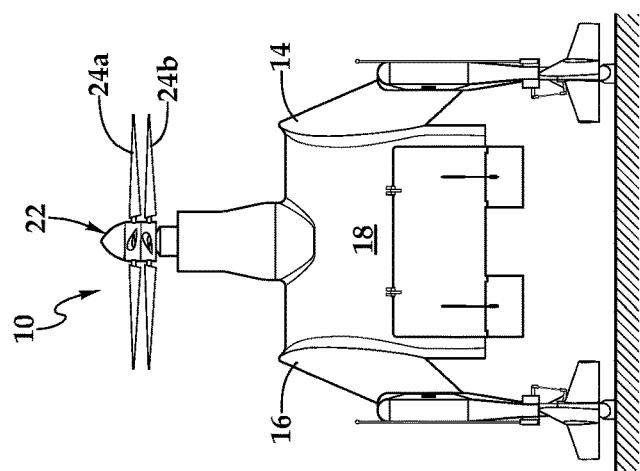

Referring additionally to FIGS. 2A-2I in the drawings, a sequential flight-operating scenario of aircraft 10 will now be described. As best seen in FIG. 2A, aircraft 10 is in a tailsitter position on a surface such as the ground or the deck of an aircraft carrier. When aircraft 10 is ready for a mission, flight control system 20 commences operations providing flight commands to the various systems of aircraft 10. Flight control system 20 may be operating responsive to autonomous flight control, remote flight control, onboard pilot flight control or a combination thereof. For example, it may be desirable to utilize onboard pilot or remote flight control during certain maneuvers such as takeoffs and landings but rely on autonomous flight control during hover, high speed forward flight and transitions between wing-borne flight and thrust-borne flight.

Figure 2B:
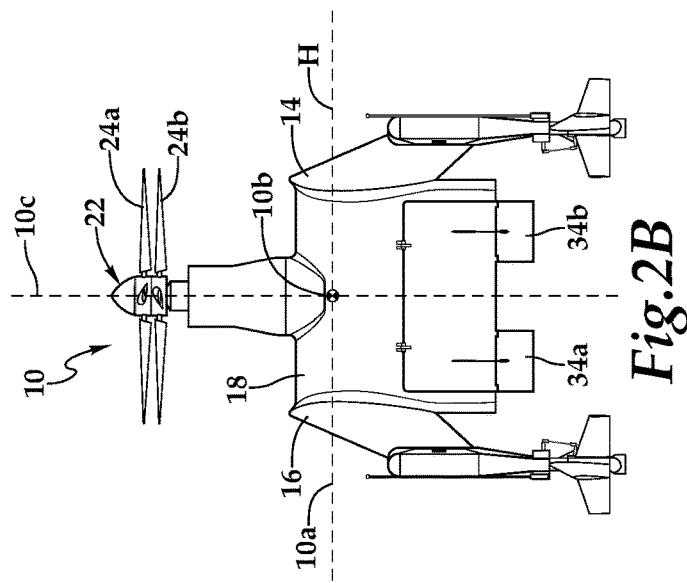

As best seen in FIG. 2B, aircraft 10 has performed a vertical takeoff and is engaged in thrust-borne lift in the VTOL orientation of aircraft 10. As illustrated, upper rotor assembly 24a and lower rotor assembly 24b are counter-rotating in generally parallel horizontal planes. As longitudinal axis 10a and lateral axis 10b (denoted as the target) are both in a horizontal plane H that is normal to the local vertical in the earth's reference frame, aircraft 10 has a level flight attitude. In the VTOL orientation, wing 16 is the forward wing and wing 14 is the aft wing. Flight control system 20 independently controls and operates upper rotor assembly 24a and lower rotor assembly 24b including independently controlling rotor speed and collective pitch. In addition, flight control system 20 controls the tilt of propulsion assembly 22 relative to fuselage 18 to generate a thrust vector.

During hover, flight control system 20 may utilize speed control and/or collective pitch control of upper rotor assembly 24a and lower rotor assembly 24b to cause aircraft 10 to climb, descend or maintain a stable hover. Also during hover, flight control system 20 may utilize thrust vectoring of propulsion assembly 22 to provide translation authority for aircraft 10. For example, as best seen in FIG. 4A, propulsion assembly 22 is tiltable forward and aftward relative to fuselage 18 to provide translation authority to aircraft 10 in the fore/aft direction, as indicated by arrow 42. When propulsion assembly 22 is tilted aftward relative to fuselage 18, as indicated by dotted propulsion assembly 22c, propulsion assembly 22 generates a thrust vector having a vertical component 44 providing thrust-borne lift for aircraft 10 and an aftward component 46 that urges aircraft 10 to translate in the aftward direction. When propulsion assembly 22 is tilted forward relative to fuselage 18, as indicated by dotted propulsion assembly 22d, propulsion assembly 22 generates a thrust vector having vertical component 44 providing thrust-borne lift for aircraft 10 and a forward component 48 that urges aircraft 10 to translate in the forward direction.

Figure 4B:
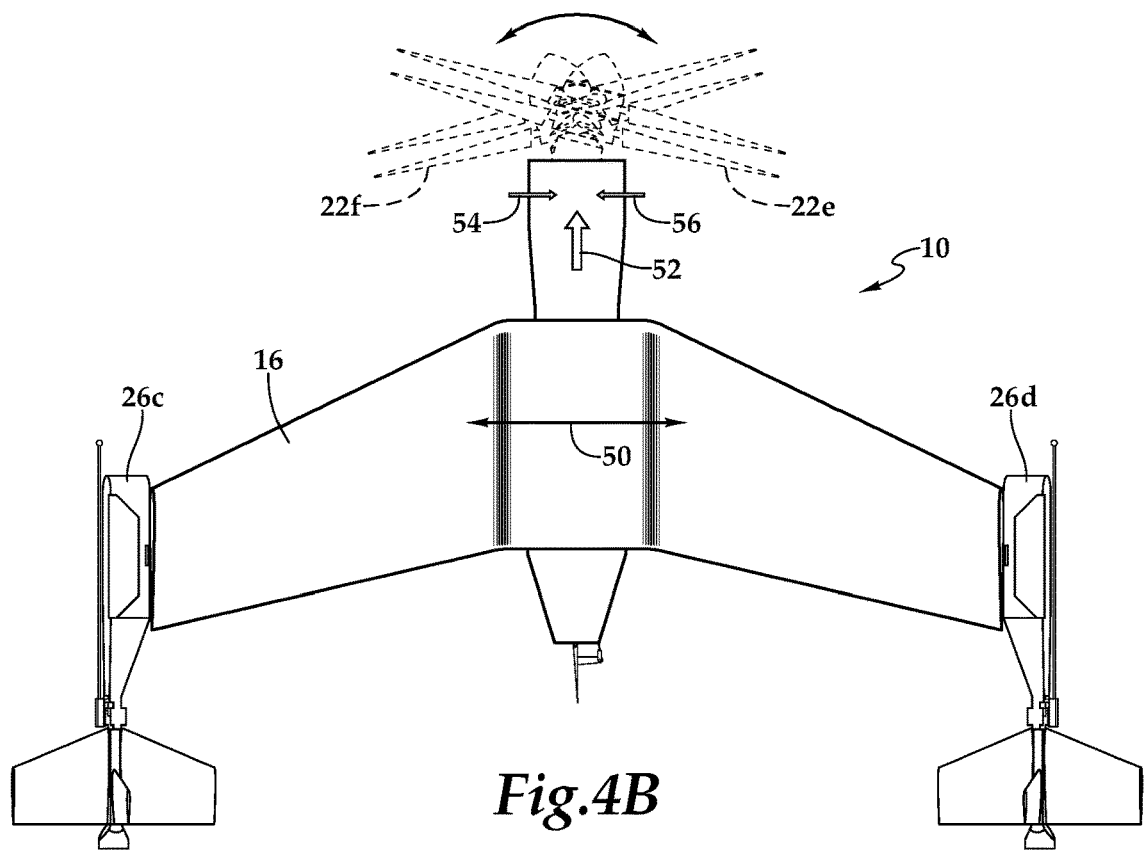
FIGS. 4A-4D are schematic illustrations of a tailsitting biplane aircraft having a coaxial rotor system in various flight configurations in accordance with embodiments of the present disclosure.
Figure 4A:
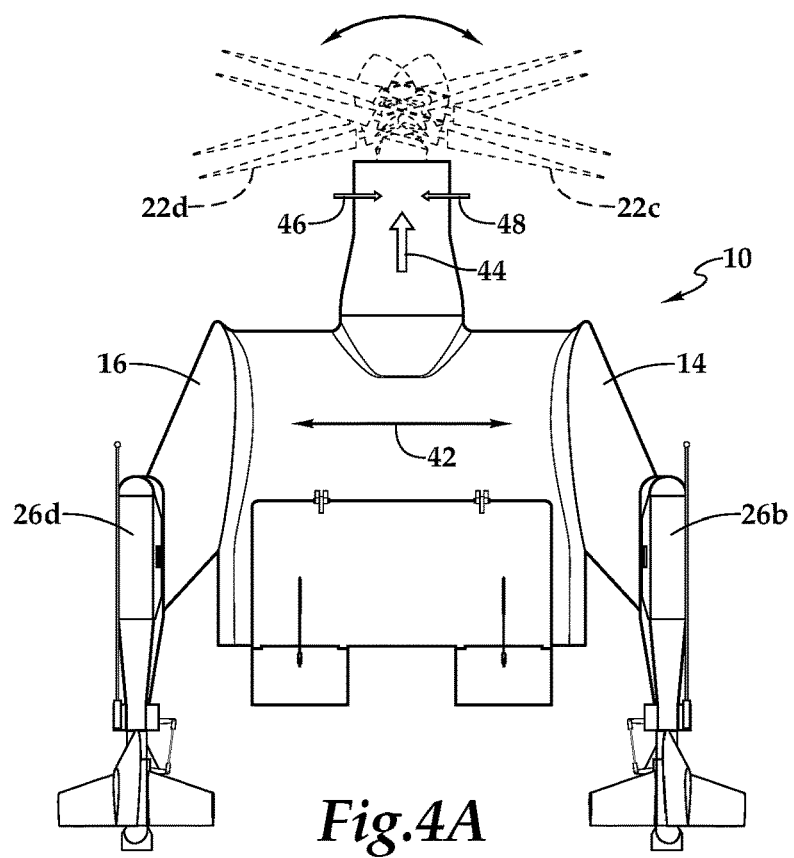

As another example, as best seen in FIG. 4B, propulsion assembly 22 is tiltable to the right and to the left relative to fuselage 18 to provide translation authority to aircraft 10 in the lateral direction, as indicated by arrow 50. When propulsion assembly 22 is tilted to the right relative to fuselage 18, as indicated by dotted propulsion assembly 22e, propulsion assembly 22 generates a thrust vector having a vertical component 52 providing thrust-borne lift for aircraft 10 and a lateral component 54 that urges aircraft 10 to translate to the right. When propulsion assembly 22 is tilted left relative to fuselage 18, as indicated by dotted propulsion assembly 22f, propulsion assembly 22 generates a thrust vector having vertical component 52 providing thrust-borne lift for aircraft 10 and a lateral component 56 that urges aircraft 10 to translate to the left.

Figure 6:
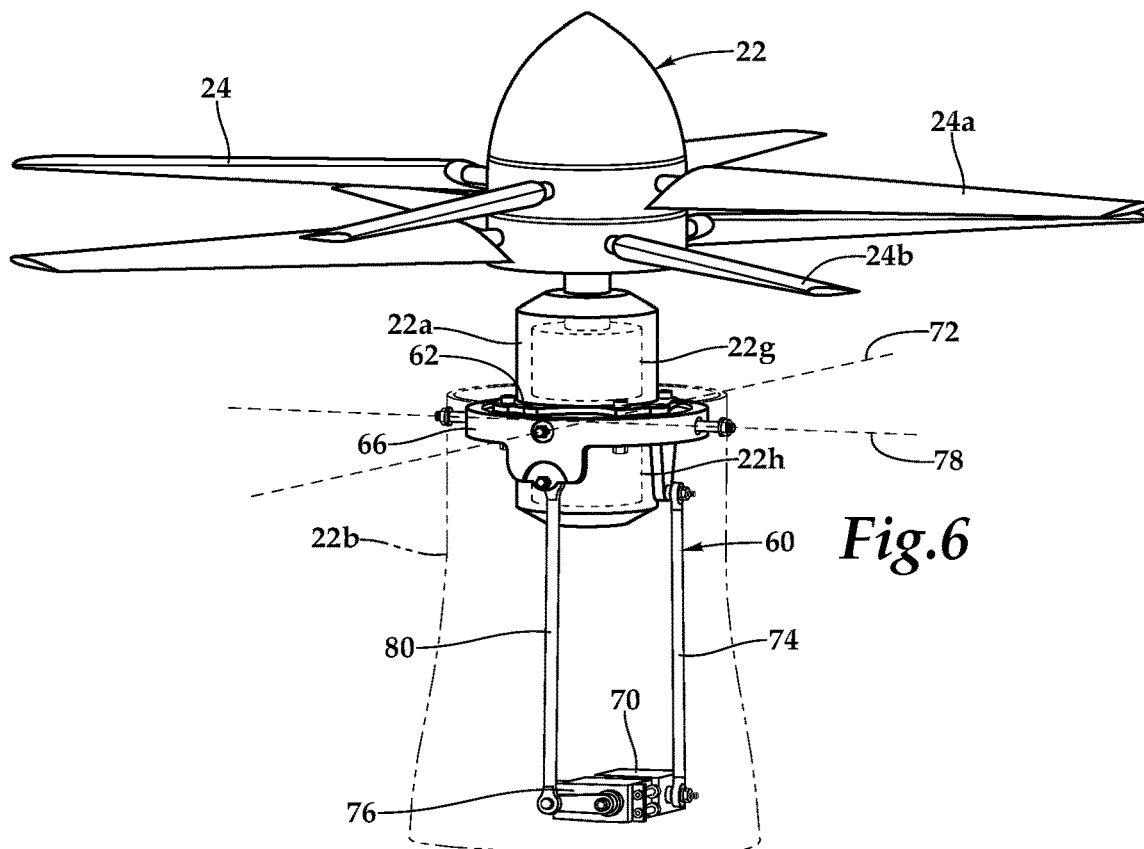
FIG. 6 depicts a propulsion assembly and gimbal assembly for a tailsitting biplane aircraft having a coaxial rotor system in accordance with embodiments of the present disclosure.

In the illustrated embodiment, the thrust vectoring capability of propulsion assembly 22 is achieved by operating a gimbal assembly 60, as best seen in FIG. 6. Gimbal assembly 60 includes an inner gimbal ring 62 that is coupled to motor assembly 22a that includes electric motors 22g, 22h that respectively provide torque and rotational energy to upper rotor assembly 24a and lower rotor assembly 24b. Gimbal assembly 60 also includes an outer gimbal ring 66 that is rotatably coupled to propulsion assembly housing 22b and rotatably coupled to inner gimbal ring 62. An inner gimbal ring actuator 70 is configured to tilt inner gimbal ring 62 relative to outer gimbal ring 66 about pitch pivot axis 72 via linkage 74, responsive to commands from flight control system 20. An outer gimbal ring actuator 76 is configured to tilt outer gimbal ring 66 relative to propulsion assembly housing 22b about lateral pivot axis 78 via linkage 80, responsive to commands from flight control system 20. In this manner, propulsion assembly 22 including coaxial rotor system 24 and motor assembly 22a is tilted relative to fuselage 18 to generate the thrust vector. Even though aircraft 10 has been depicted in FIG. 4A and described in reference thereto as being configurable for fore/aft translation and even though aircraft 10 has been depicted in FIG. 4B and described in reference thereto as being configurable for lateral translation, it should be understood by those having ordinary skill in the art that the orthogonal pivot axes of gimbal assembly 60 provide for tilting of propulsion assembly 22 in any radial direction relative to fuselage 18 such that propulsion assembly 22 has omnidirectional thrust vectoring capability and such that aircraft 10 has omnidirectional translation capability in hover.

Continuing with the sequential flight-operating scenario, aircraft 10 remains in the hover operation in FIG. 2B. During hover, flight control system 20 may utilize differential rotor speed, differential collective pitch and/or differential yaw vane positioning to provide yaw authority for aircraft 10. For example, to maintain a stable hover, differential rotor speed may be used wherein the average rotor speed of upper rotor assembly 24a and lower rotor assembly 24b is held constant while increasing the rotor speed of one of upper rotor assembly 24a and lower rotor assembly 24b and decreasing the rotor speed of the other of upper rotor assembly 24a and lower rotor assembly 24b to create a torque imbalance that provides yaw authority for aircraft 10. In the illustrated embodiment with upper rotor assembly 24a rotating counterclockwise and lower rotor assembly 24b rotating clockwise when aircraft 10 is viewed from above, increasing the rotor speed of upper rotor assembly 24a and decreasing the rotor speed of lower rotor assembly 24b will cause aircraft 10 to rotate about vertical axis 10c in the clockwise direction. Similarly, decreasing the rotor speed of upper rotor assembly 24a and increasing the rotor speed of lower rotor assembly 24b will cause aircraft 10 to rotate about vertical axis 10c in the counterclockwise direction.

As another example, to maintain a stable hover, differential collective pitch may be used wherein the effective collective pitch of upper rotor assembly 24a and lower rotor assembly 24b is held constant while increasing the collective pitch of one of upper rotor assembly 24a and lower rotor assembly 24b and decreasing the collective pitch of the other of upper rotor assembly 24a and lower rotor assembly 24b to create a torque imbalance that provides yaw authority for aircraft 10. In the illustrated embodiment with upper rotor assembly 24a rotating counterclockwise and lower rotor assembly 24b rotating clockwise when aircraft 10 is viewed from above, increasing the collective pitch of upper rotor assembly 24a and decreasing the collective pitch of lower rotor assembly 24b will cause aircraft 10 to rotate about vertical axis 10c in the clockwise direction. Similarly, decreasing the collective pitch of upper rotor assembly 24a and increasing the collective pitch of lower rotor assembly 24b will cause aircraft 10 to rotate about vertical axis 10c in the counterclockwise direction.

Figure 4D:
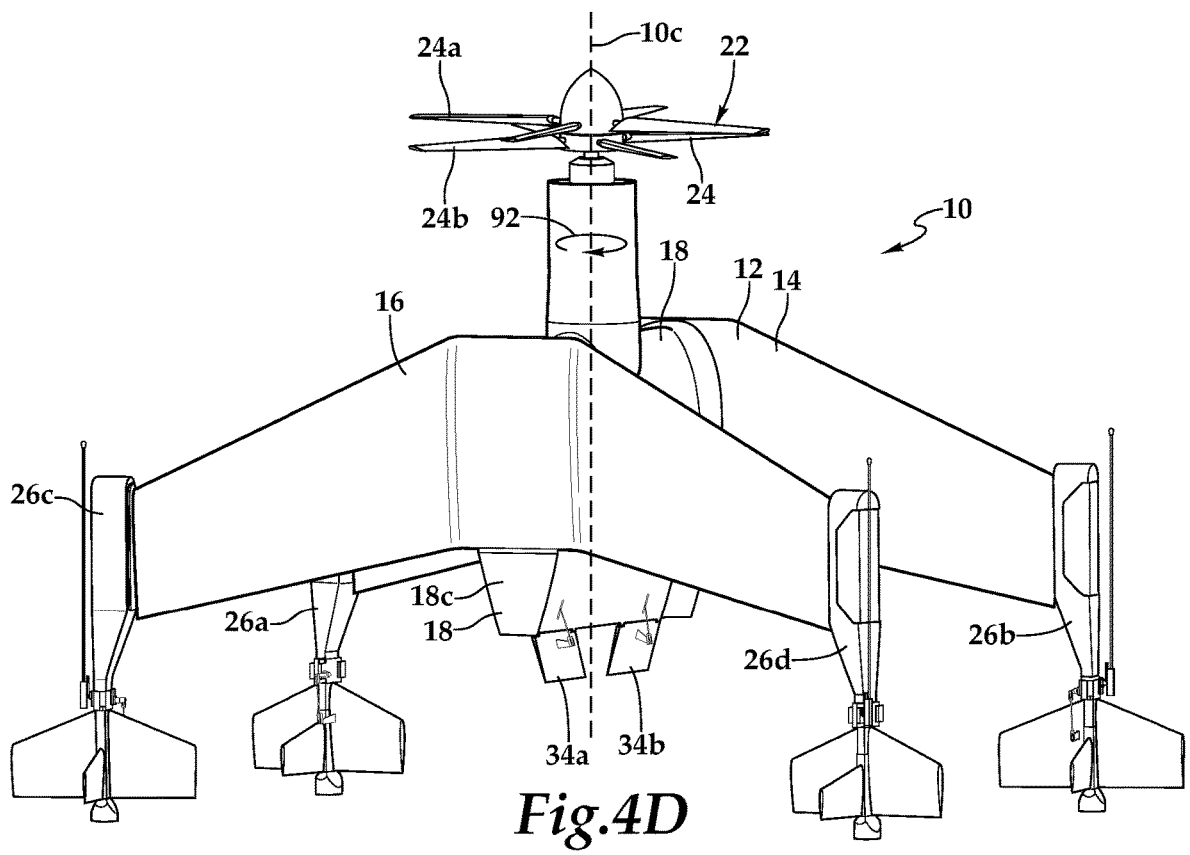
Figure 4C:
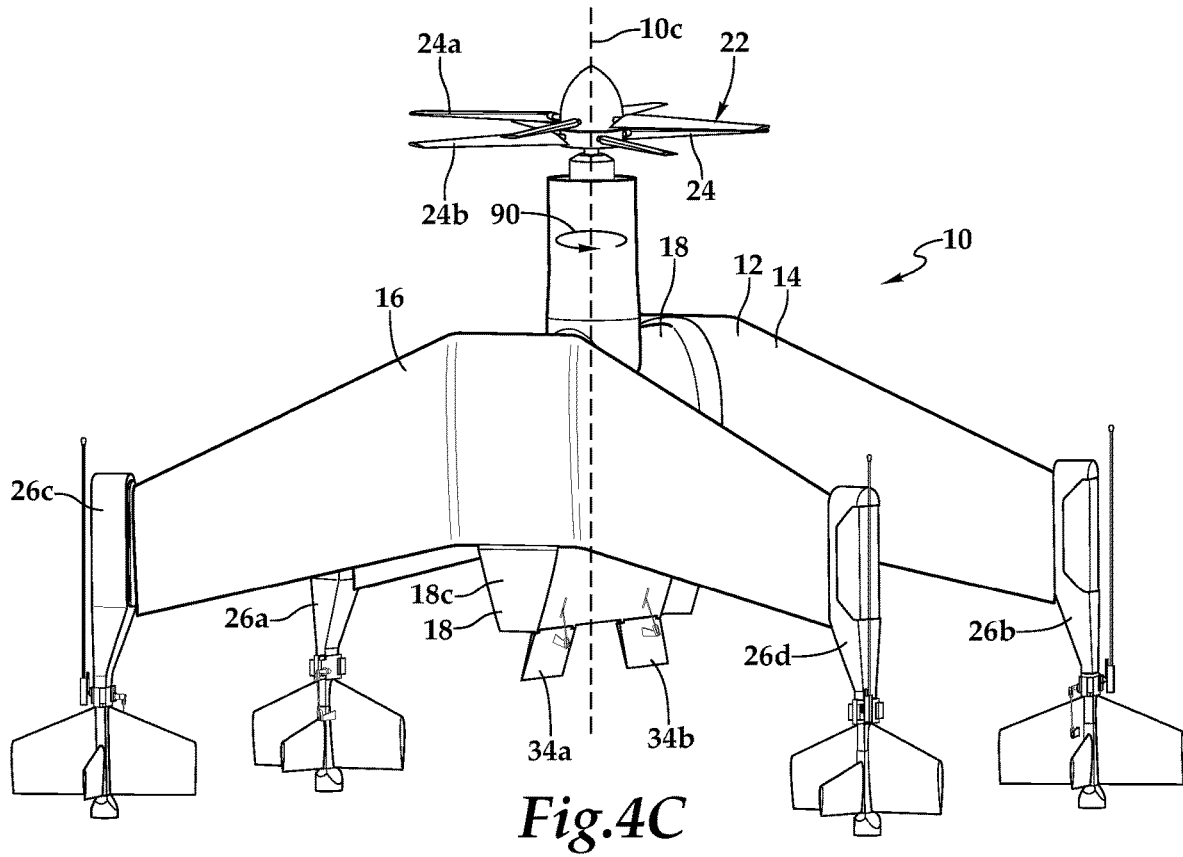

In a further example, yaw vanes 34a, 34b may be operated differentially to create yaw moments in response to propulsion downwash generated by propulsion system 22 over yaw vanes 34a, 34b. As best seen in FIG. 4C, when yaw vane 34a is shifted to the left and yaw vane 34b is shifted to the right, when aircraft 10 is viewed from a forward position during hover, the propulsion downwash acting on yaw vanes 34a, 34b creates yaw moments about the center of gravity of aircraft 10 that urge aircraft 10 to rotate about vertical axis 10c in the counterclockwise direction, as indicated by arrow 90. Similarly, as best seen in FIG. 4D, when yaw vane 34a is shifted to the right and yaw vane 34b is shifted to the left, when aircraft 10 is viewed from a forward position during hover, the propulsion downwash acting on yaw vanes 34a, 34b creates yaw moments about the center of gravity of aircraft 10 that urge aircraft 10 to rotate about vertical axis 10c in the clockwise direction, as indicated by arrow 92. In the illustrated embodiment, the differential positioning of yaw vanes 34a, 34b is achieved by operation of actuators positioned within aft door 18c of fuselage 18.

Figure 7:
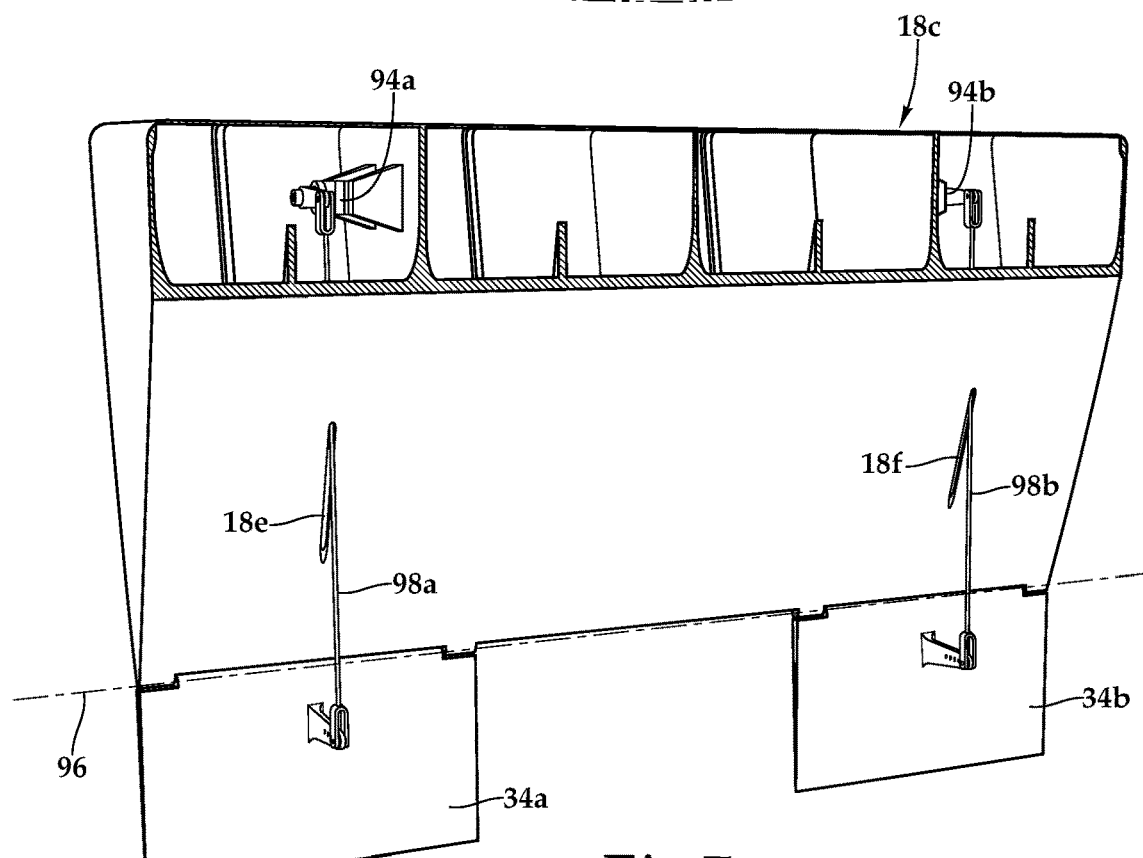
FIG. 7 depicts an aft door of a fuselage, in partial cutaway, for a tailsitting biplane aircraft having a coaxial rotor system in accordance with embodiments of the present disclosure.

As best seen in FIG. 7, yaw vanes 34a, 34b are symmetrically disposed and pivotably coupled to the aft end of fuselage 18 and more specifically to the aft end of aft door 18c. It is noted that in the illustrated embodiment, a portion of aft door 18c has been cut away to reveal yaw vane actuators 94a, 94b that are mounted within aft door 18c. Yaw vane actuator 94a is configured to tilt yaw vane 34a relative to aft door 18c about a pivot axis 96 via linkage 98a that extends through a slot 18e in aft door 18c. Yaw vane actuator 94b is configured to tilt yaw vane 34b relative to aft door 18c about pivot axis 96 via linkage 98b that extends through a slot 18f in aft door 18c. Yaw vane actuators 94a, 94b are independently operated responsive to commands from flight control system 20 such that yaw vanes 34a, 34b may be collectively or differentially pivoted relative to aft door 18c.

In addition to using the yaw authority mechanisms described herein to individually provide yaw authority for aircraft 10 during hover, flight control system 20 can command multiple yaw authority mechanisms to operate together to provide yaw authority for aircraft 10 during hover. For example, to cause aircraft 10 to rotate about vertical axis 10c in the clockwise direction, flight control system 20 could increase the rotor speed and increase the collective pitch of upper rotor assembly 24a while decreasing the rotor speed and decreasing the collective pitch of lower rotor assembly 24b. To cause aircraft 10 to rotate about vertical axis 10c in the counterclockwise direction, flight control system 20 could decrease the rotor speed and decrease the collective pitch of upper rotor assembly 24a while increasing the rotor speed and increasing the collective pitch of lower rotor assembly 24b. As another example, to cause aircraft 10 to rotate about vertical axis 10c in the clockwise direction, flight control system 20 could increase the rotor speed of upper rotor assembly 24a, decrease the rotor speed of lower rotor assembly 24b, shift yaw vane 34a to the left and shift yaw vane 34b to the right. To cause aircraft 10 to rotate about vertical axis 10c in the counterclockwise direction, flight control system 20 could decrease the rotor speed of upper rotor assembly 24a, increase the rotor speed of lower rotor assembly 24b, shift yaw vane 34a to the right and shift yaw vane 34b to the left.

In a further example, to cause aircraft 10 to rotate about vertical axis 10c in the clockwise direction, flight control system 20 could increase the collective pitch of upper rotor assembly 24a, decrease the collective pitch of lower rotor assembly 24b, shift yaw vane 34a to the left and shift yaw vane 34b to the right. To cause aircraft 10 to rotate about vertical axis 10c in the counterclockwise direction, flight control system 20 could decrease the collective pitch of upper rotor assembly 24a, increase the collective pitch of lower rotor assembly 24b, shift yaw vane 34a to the right and shift yaw vane 34b to the left. Additionally, to cause aircraft 10 to rotate about vertical axis 10c in the clockwise direction, flight control system 20 could increase the collective pitch and rotor speed of upper rotor assembly 24a, decrease the collective pitch and rotor speed of lower rotor assembly 24b, shift yaw vane 34a to the left and shift yaw vane 34b to the right. To cause aircraft 10 to rotate about vertical axis 10c in the counterclockwise direction, flight control system 20 could decrease the collective pitch and rotor speed of upper rotor assembly 24a, increase the collective pitch and rotor speed of lower rotor assembly 24b, shift yaw vane 34a to the right and shift yaw vane 34b to the left. Using more than one and/or different combinations of yaw authority mechanisms can be beneficial depending upon aircraft parameters, flight dynamics and/or environmental factors including altitude, attitude, temperature, thrust to weight ratio, wind speed, wind direction, desired yaw rate and other considerations known to those having ordinary skill in the art.

In embodiments wherein the rotor disk of coaxial rotor system 24 has a ratio to the wingspan of wings 14, 16 on the order of 1 to 1 or greater, differential operations of elevons 30 may be used to complement other yaw authority mechanisms in hover or as a standalone yaw authority mechanism in hover. For example, when elevons 30a, 30c are tilted forward (see FIG. 8B) and elevons 30b, 30d are tilted aftward (see FIG. 8C), propulsion downwash generated by propulsion system 22 over elevons 30 creates yaw moments about the center of gravity of aircraft 10 that urge aircraft 10 to rotate about vertical axis 10c in the counterclockwise direction, as seen from above in FIG. 1E. Similarly, when elevons 30b, 30d are tilted forward (see FIG. 8B) and elevons 30a, 30c are tilted aftward (see FIG. 8C), propulsion downwash generated by propulsion system 22 over elevons 30 creates yaw moments about the center of gravity of aircraft 10 that urge aircraft 10 to rotate about vertical axis 10c in the clockwise direction, as seen from above in FIG. 1E.

In embodiments wherein propulsion assembly 22 is gimbal mounted to fuselage 18 with a single axis gimbal in which propulsion assembly 22 is tiltable only forward and aftward relative to fuselage 18, pitch axis thrust vectoring provides translation authority to aircraft 10 in the fore/aft direction 42 in hover (see FIG. 4A). When propulsion assembly 22 is tilted aftward relative to fuselage 18, as indicated by dotted propulsion assembly 22c, propulsion assembly 22 generates a thrust vector having a vertical component 44 providing thrust-borne lift for aircraft 10 and an aftward component 46 that urges aircraft 10 to translate in the aftward direction. When propulsion assembly 22 is tilted forward relative to fuselage 18, as indicated by dotted propulsion assembly 22d, propulsion assembly 22 generates a thrust vector having vertical component 44 providing thrust-borne lift for aircraft 10 and a forward component 48 that urges aircraft 10 to translate in the forward direction. In such single axis gimbal embodiments of propulsion assembly 22, translation authority for aircraft 10 in the lateral direction is provided by collective operation of yaw vanes 34a, 34b to create lateral forces acting on yaw vanes 34a, 34b in response to propulsion downwash generated by propulsion system 22 over yaw vanes 34a, 34b. Collectively shifting yaw vanes 34a, 34b to the left, urges aircraft 10 to translate to the right (see FIG. 1B). Likewise, collectively shifting yaw vanes 34a, 34b to the right, urges aircraft 10 to translate to the left. Coordinated pitch axis thrust vectoring and collective yaw vane operation provide omnidirectional translation capability to aircraft 10 in hover. Alternatively or additionally, in such single axis gimbal embodiments of propulsion assembly 22, aircraft 10 is operable to translate in any direction by first, rotating aircraft 10 about yaw axis 10c to a desired fore/aft or longitudinal orientation then second, pitch axis thrust vectoring to translate in the desired direction.

Figure 2C:
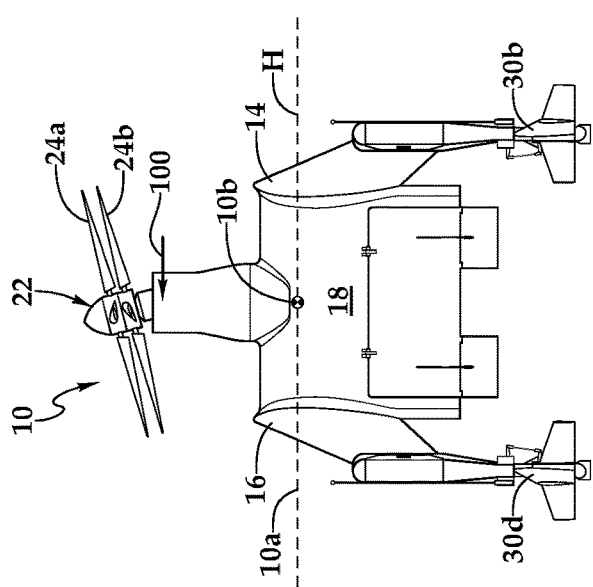

Continuing with the sequential flight-operating scenario, aircraft 10 has completed the vertical ascent to a desired elevation in FIG. 2C and may now begin the transition from thrust-borne lift to wing-borne lift. As best seen from the progression of FIGS. 2C-2E, aircraft 10 is operable to pitch down from the VTOL orientation toward the biplane orientation to enable high speed and/or long range forward flight. As seen in FIG. 2C, aircraft 10 begins the process by tilting propulsion assembly 22 forward relative to fuselage 18 during the climb. In this configuration, propulsion assembly 22 generates a thrust vector having a forward component 100 that not only urges aircraft 10 to travel in the forward direction but also urges aircraft 10 to rotate about pitch axis 10b. As the forward airspeed of aircraft 10 increases, collective operation of elevons 30 can be used to enhance the pitch down rotation of aircraft 10. As seen in FIG. 2D, longitudinal axis 10a extends out of the horizontal plane H such that aircraft 10 has an inclined flight attitude of about forty-five degrees pitch down. As illustrated, elevons 30 are tilted aftward relative to tail assemblies 26 (see FIG. 8C) and play a progressively larger role in the pitch control of aircraft 10 as the forward speed and inclined flight attitude increase to an aerodynamic flight condition. At the same time, the tilt of propulsion assembly 22 relative to fuselage 18 is preferably being reduced.

As best seen in FIG. 2E, aircraft 10 has completed the transition to the biplane orientation with forward rotor assembly 24a and aft rotor assembly 24b counter-rotating in generally parallel vertical planes. In the biplane orientation, wing 14 is above fuselage 18 and wing 16 is below fuselage 18. By convention, longitudinal axis 10a has been reset to be in the horizontal plane H, which also includes lateral axis 10b, such that aircraft 10 has a level flight attitude in the biplane orientation. As forward flight with wing-borne lift requires significantly less power than VTOL flight with thrust-borne lift, the operating speed and/or collective pitch of forward rotor assembly 24a and aft rotor assembly 24b may be reduced. In the biplane orientation, the independent control provided by flight control system 20 over elevons 30 and yaw vanes 34a, 34b provides pitch, roll and yaw authority for aircraft 10 which may be enhanced or complemented with thrust vectoring of propulsion assembly 22.

Figure 5B:
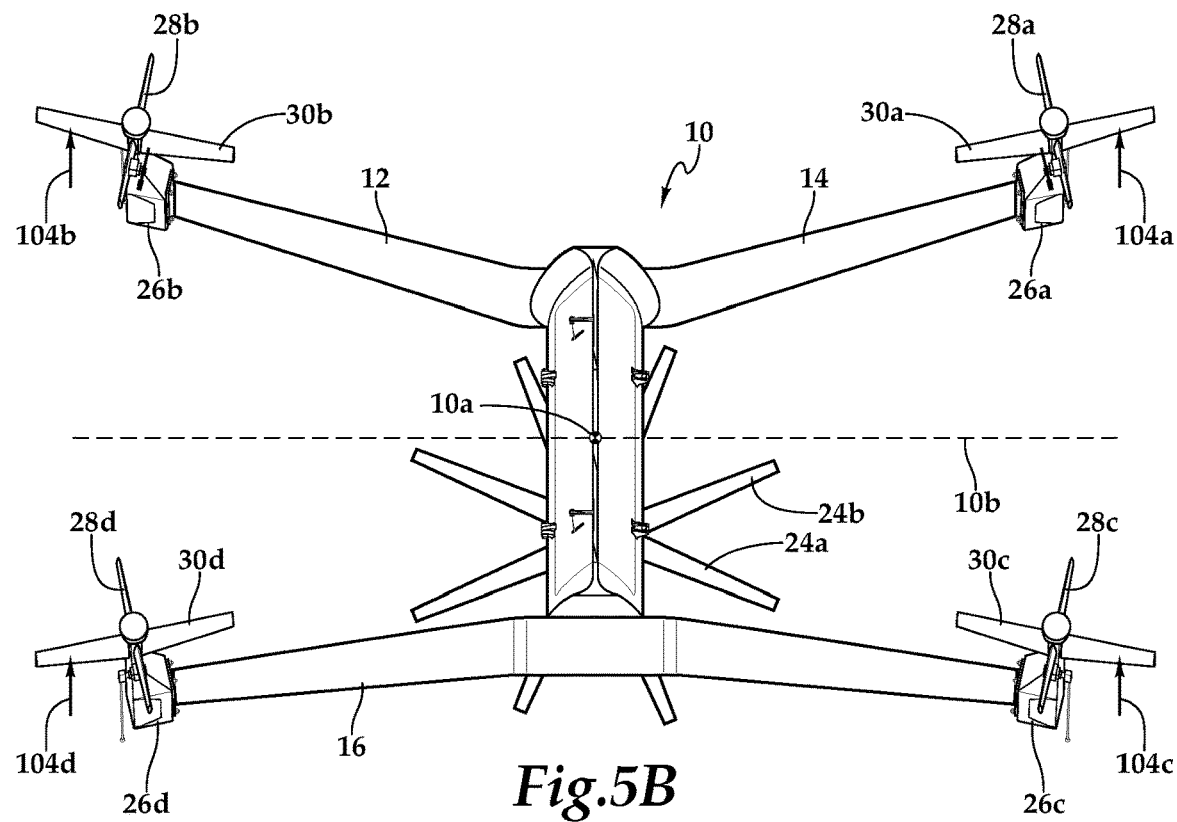
FIGS. 5A-5H are schematic illustrations of a tailsitting biplane aircraft having a coaxial rotor system in various flight configurations in accordance with embodiments of the present disclosure.
Figure 5A:
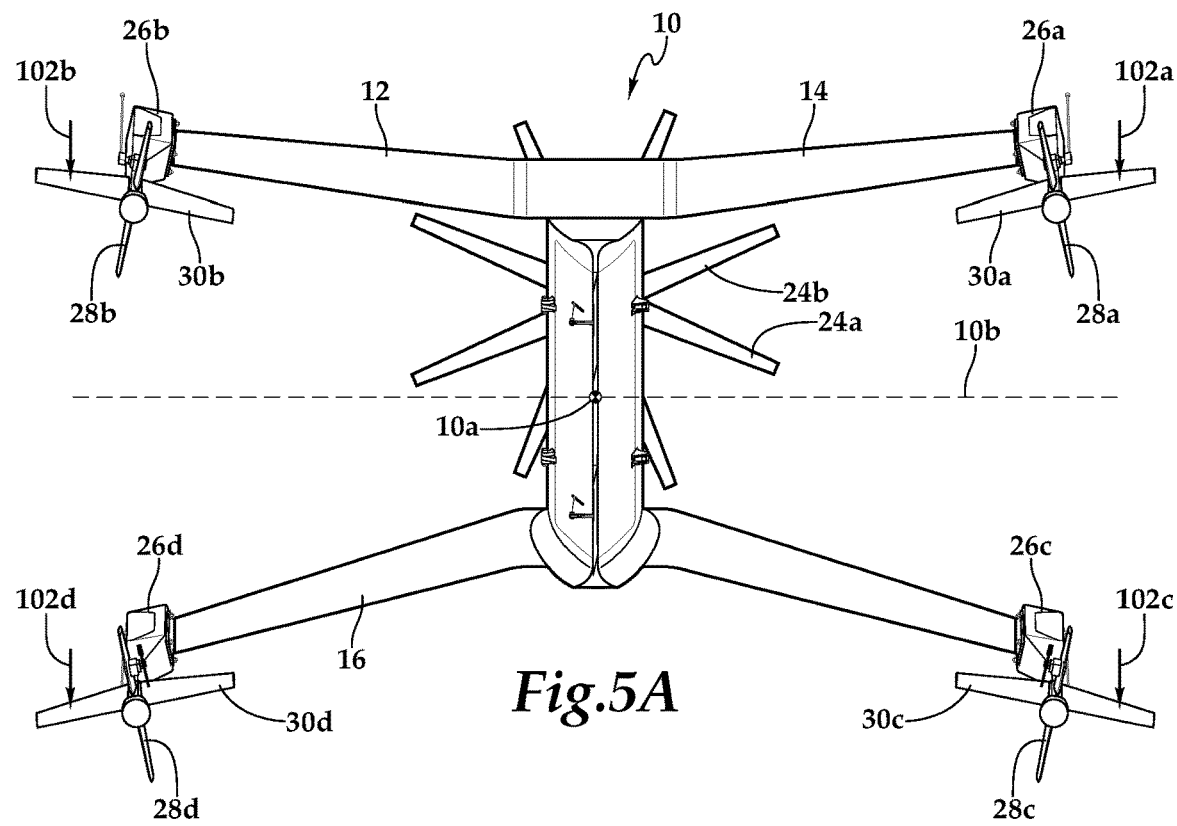

For example, collective operations of elevons 30 provide pitch authority for aircraft 10 to control, maintain or change the angle of attack of wings 14, 16 during forward flight. As best seen in FIG. 5A, when each of elevons 30 is tilted forward (see FIG. 8B), the airflow across elevons 30 creates pitch moments having a downward component on elevons 30, as indicted by arrows 102a, 102b, 102c, 102d. Pitch moments 102a, 102b, 102c, 102d urge aircraft 10 to rotate about pitch axis 10b, increasing the angle of attack of wings 14, 16 and tending to cause aircraft 10 to climb. Similarly, as best seen in FIG. 5B, when each of elevons 30 is tilted aftward (see FIG. 8C), the airflow across elevons 30 creates pitch moments having an upward component on elevons 30, as indicted by arrows 104a, 104b, 104c, 104d. Pitch moments 104a, 104b, 104c, 104d urge aircraft 10 to rotate about pitch axis 10b, decreasing the angle of attack of wings 14, 16 and tending to cause aircraft 10 to descend.

Figure 5D:
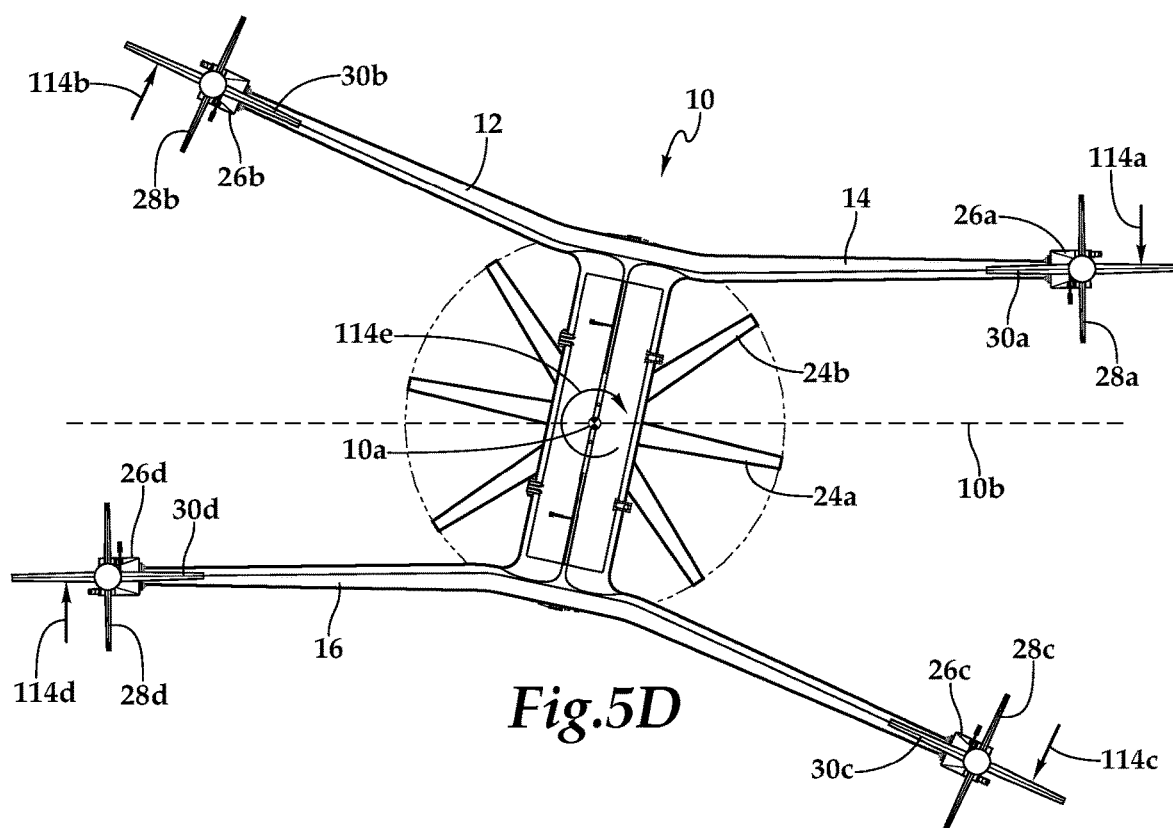
Figure 5C:
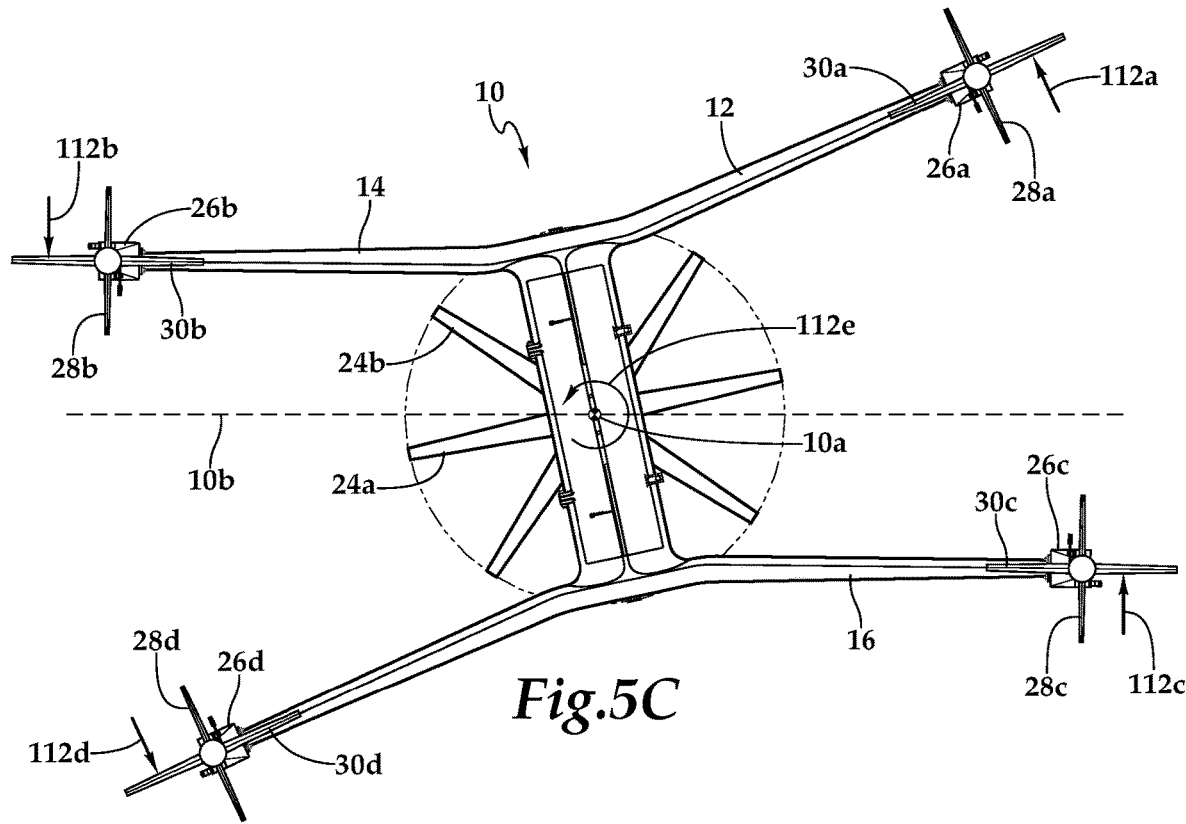

As another example, differential operations of elevons 30 provide roll authority for aircraft 10 to control, maintain or change the roll angle of aircraft 10 during forward flight. As best seen in FIG. 5C, when elevons 30b, 30d are tilted forward (see FIG. 8B) and elevons 30a, 30c are tilted aftward (see FIG. 8C), the airflow across elevons 30 creates roll moments acting generally perpendicularly to elevons 30, as indicted by arrows 112a, 112b, 112c, 112d. Roll moments 112a, 112b, 112c, 112d urge aircraft 10 to rotate about roll axis 10a in the roll left direction, as indicated by arrow 112e. Similarly, best seen in FIG. 5D, when elevons 30a, 30c are tilted forward (see FIG. 8B) and elevons 30b, 30d are tilted aftward (see FIG. 8C), the airflow across elevons 30 creates roll moments acting generally perpendicularly to elevons 30, as indicted by arrows 114a, 114b, 114c, 114d. Roll moments 114a, 114b, 114c, 114d urge aircraft 10 to rotate about roll axis 10a in the roll right direction, as indicated by arrow 114e.

Figure 8C:
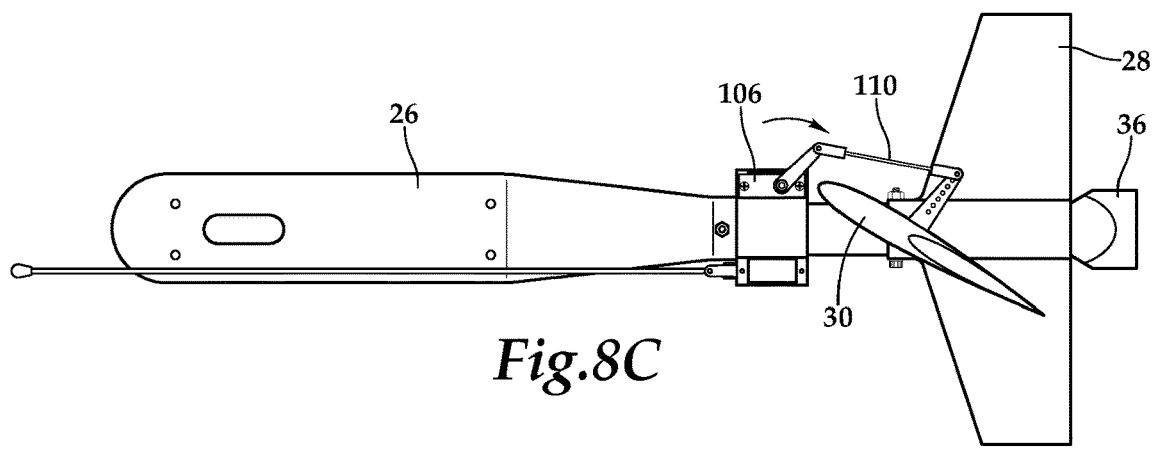
FIGS. 8A-8C depict a tail assembly in various operating configurations for a tailsitting biplane aircraft having a coaxial rotor system in accordance with embodiments of the present disclosure.
Figure 8B:
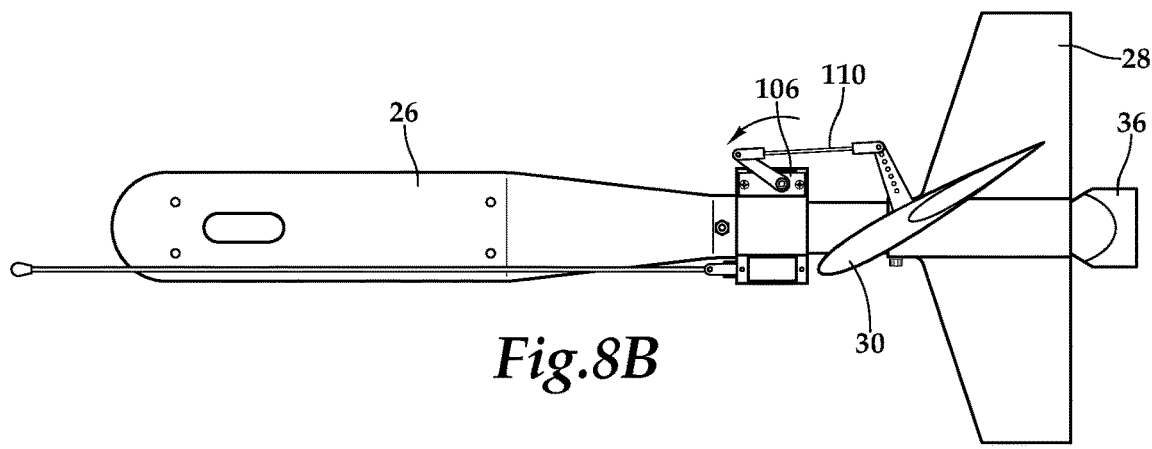
Figure 8A:
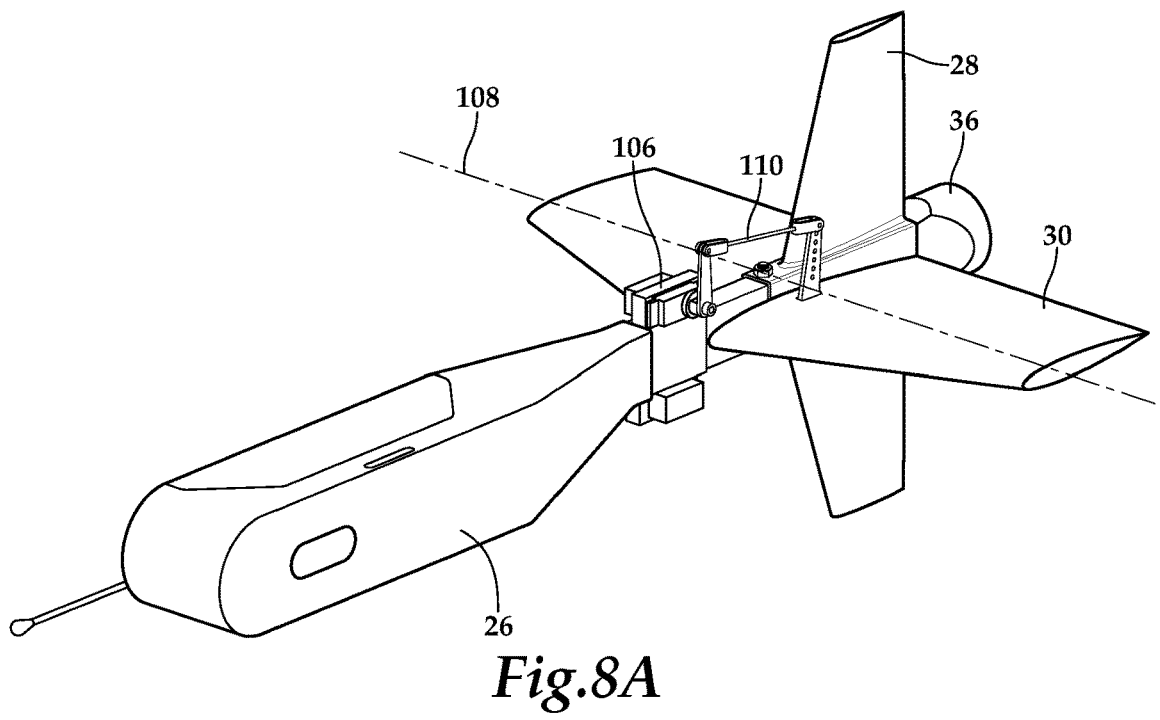

The operation of elevons 30 is best seen in FIGS. 8A-8C in which a generic tail assembly 26 is depicted. Tail assembly 26 includes a fixed vertical stabilizer 28 and a tiltable elevon 30 proximate the distal end of tail assembly 26. In the illustrated embodiment, an elevon actuator 106 is configured to tilt elevon 30 relative to tail assembly 26 about elevon axis 108 via linkage 110 responsive to commands from flight control system 20. When elevon actuator 106 shifts linkage 110 forward, elevon 30 is tilted forward relative to tail assembly 26, as best seen in FIG. 8B. Collectively tilting each elevon 30 of aircraft 10 forward in this manner creates pitch moments 102a, 102b, 102c, 102d described above with reference to FIG. 5A. Likewise, when elevon actuator 106 shifts linkage 110 aftward, elevon 30 is tilted aftward relative to tail assembly 26, as best seen in FIG. 8C. Collectively tilting each elevon 30 of aircraft 10 aftward in this manner creates pitch moments 104a, 104b, 104c, 104d described above with reference to FIG. 5B. As described herein, elevons 30 may be differentially operated wherein some of elevons 30 are tilted forward and some of elevons 30 are tilted aftward creating, for example, roll moments 112a, 112b, 112c, 112d described above with reference to FIG. 5C or roll moments 114a, 114b, 114c, 114d described above with reference to FIG. 5D.

It is noted that the use of the distributed array of elevons 30 operated by flight control system 20 provides unique advantages for the safety and reliability of aircraft 10 during flight. For example, in the event that flight control system 20 detects a fault with one of the elevons 30, flight control system 20 is operable to perform corrective action responsive to the detected fault at a distributed elevon level or at a coordinated distributed elevon and propulsion assembly level. As an example and referring again to FIGS. 5A-5D, flight control system 20 has detects a fault in elevon 30b based upon information received from one or more sensors or based upon aircraft response to prior actuation commands. As a first step, flight control system 20 shuts down further operation of elevon 30b, preferably in a neutral position as represented in FIG. 8A. Flight control system 20 now determines what other corrective measures should be implemented based upon the desired maneuvers to be performed by aircraft 10. For example, flight control system 20 may determine that certain operational changes are appropriate, such as selective use or nonuse of the laterally opposed elevon 30a on upper wing 14, the longitudinally opposed elevon 30d on lower wing 16 and/or the diametrically opposed elevon 30c on lower wing 16. In addition to corrective action at the distributed elevon level, flight control system 20 can augment such operations by performing corrective actions with propulsion assembly 22.

For example, to achieve the pitch up maneuver depicted in FIG. 5A during an elevon 30b fault, flight control system 20 is configured to leave the laterally opposed elevon 30a in the neutral position of FIG. 8A and to actuate elevons 30c, 30d to the forward tilt configuration of FIG. 8B creating pitch control moments 102c, 102d that urge aircraft 10 to rotate in the pitch up direction about pitch axis 10b. In addition, flight control system 20 is configured to coordinate this distributed elevon operation with the upward tilting of propulsion assembly 22 to generate a thrust vector having an upward component, which also tends to urge aircraft 10 to rotate in the pitch up direction about pitch axis 10b. Similarly, to achieve the pitch down maneuver depicted in FIG. 5B during an elevon 30b fault, flight control system 20 is configured to leave the laterally opposed elevon 30a in the neutral position of FIG. 8A and to actuate elevons 30c, 30d in the aftward tilt configuration of FIG. 8C creating pitch control moments 104c, 104d that urge aircraft 10 to rotate in the pitch down direction about pitch axis 10b. In addition, flight control system 20 is configured to coordinate this distributed elevon operation with the downward tilting of propulsion assembly 22 to generate a thrust vector having a downward component, which also tends to urge aircraft 10 to rotate in the pitch down direction about pitch axis 10b.

As another example, to achieve the roll left maneuver depicted in FIG. 5C during an elevon 30b fault, flight control system 20 is configured to leave the diametrically opposed elevon 30c in the neutral position of FIG. 8A, to actuate elevon 30a to the aftward tilt configuration of FIG. 8C and to actuate elevon 30d to the forward tilt configuration of FIG. 8B creating roll control moments 112a, 112d that urge aircraft 10 to rotate in the roll left direction about roll axis 10a. In addition, flight control system 20 is configured to coordinate this distributed elevon operation with the creation of a torque imbalance with propulsion assembly 22. This is achieved by increasing the collective pitch of forward rotor assembly 24a, decreasing the collective pitch of aft rotor assembly 24b or both and/or by increasing the rotor speed of forward rotor assembly 24a, decreasing the rotor speed of aft rotor assembly 24b or both, which also tends to urge aircraft 10 to rotate in the roll left direction about roll axis 10a. Similarly, to achieve the roll right maneuver depicted in FIG. 5D during an elevon 30b fault, flight control system 20 is configured to leave the diametrically opposed elevon 30c in the neutral position of FIG. 8A, to actuate elevon 30a to the forward tilt configuration of FIG. 8B and to actuate elevon 30d to the aftward tilt configuration of FIG. 8C creating roll control moments 114a, 114d that urge aircraft 10 to rotate in the roll right direction about roll axis 10a. In addition, flight control system 20 is configured to coordinate this distributed elevon operation with the creation of a torque imbalance with propulsion assembly 22. This is achieved by decreasing the collective pitch of forward rotor assembly 24a, increasing the collective pitch of aft rotor assembly 24b or both and/or by decreasing the rotor speed of forward rotor assembly 24a, increasing the rotor speed of aft rotor assembly 24b or both, which also tends to urge aircraft 10 to rotate in the roll right direction about roll axis 10a.

Figure 5F:
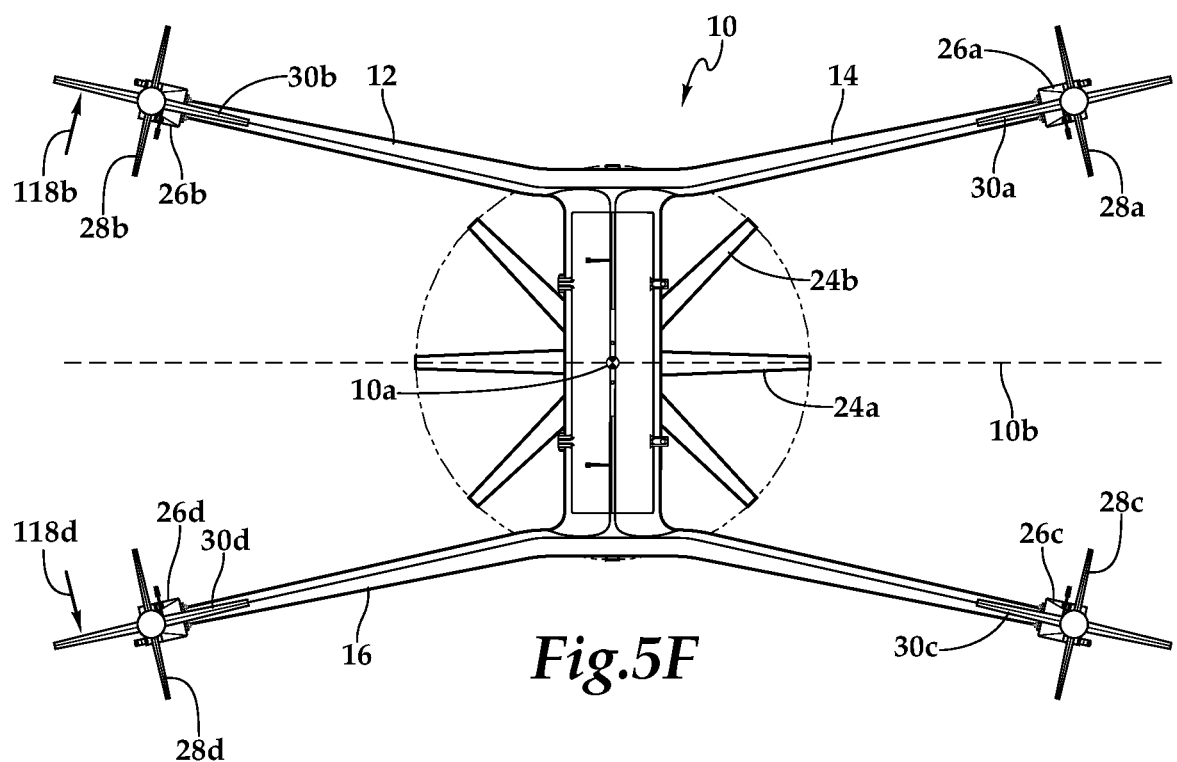
Figure 5E:
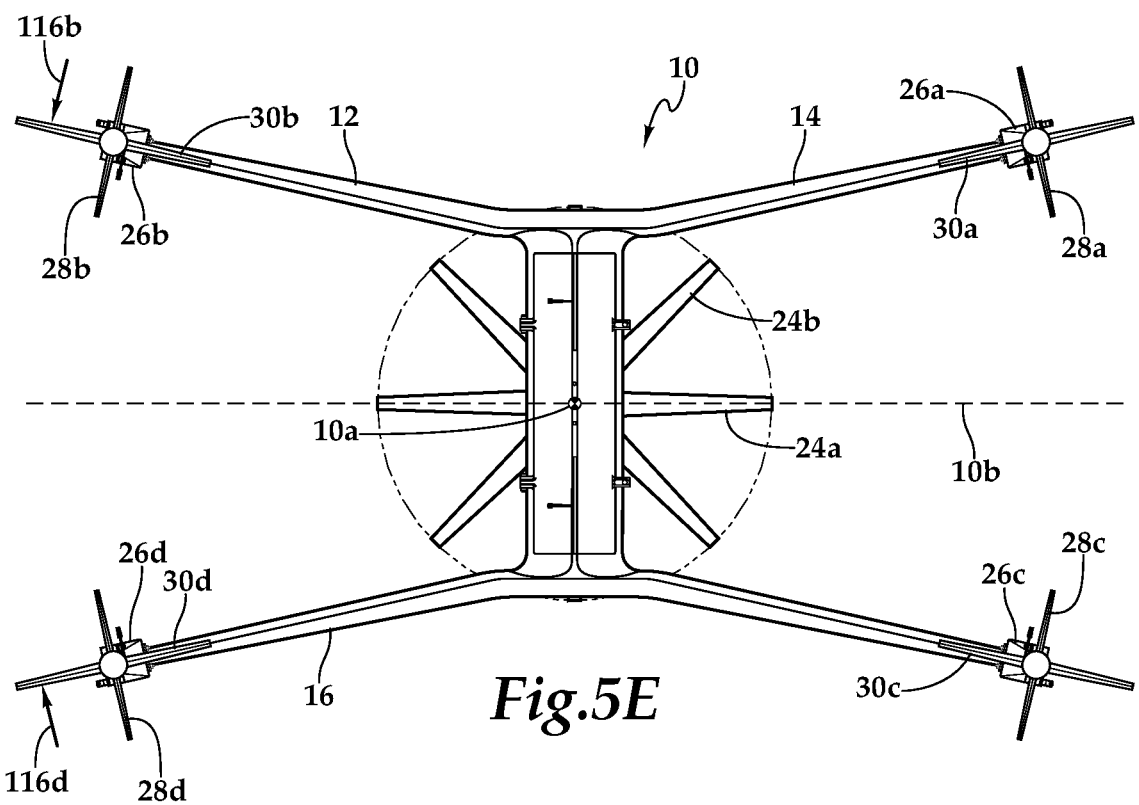

It is noted that if elevon 30b is not shut down in the neutral position as represented in FIG. 8A but instead becomes frozen in an active position such as that of FIG. 8B or 8C, flight control system 20 is configured to take corrective action to overcome this elevon fault at the distributed elevon level. For example, as best seen in FIG. 5E, if elevon 30b becomes frozen in the tilt forward position depicted in FIG. 8B generating pitch and roll moment 116b, flight control system 20 is configured to actuate the longitudinally opposed elevon 30d to the tilt aftward position depicted in FIG. 8C to generate an opposing pitch and roll moment 116d. Similarly, as best seen in FIG. 5F, if elevon 30b becomes frozen in the tilt aftward position depicted in FIG. 8C generating pitch and roll moment 118b, flight control system 20 is configured to actuate the longitudinally opposed elevon 30d to the tilt forward position depicted in FIG. 8B to generate an opposing pitch and roll moment 118d. In either of these scenarios, flight control system 20 is configured to coordinate this distributed elevon operation with the upward or downward tilting of propulsion assembly 22 to generate a thrust vector having the desired component, to urge aircraft 10 to rotate in the desired direction about pitch axis 10b for pitch authority. Likewise, flight control system 20 is configured to coordinate this distributed elevon operation with the creation of a torque imbalance with propulsion assembly 22 by changing the collective pitch and/or rotor speed of forward rotor assembly 24a and/or aft rotor assembly 24b as required to urge aircraft 10 to rotate in the desired roll direction about roll axis 10a.

As discussed herein, the distributed array of elevons 30 operated by flight control system 20 provides numerous and redundant paths to maintain the airworthiness of aircraft 10, even when a fault occurs within the distributed array of elevons 30. In addition to taking corrective action at the distributed elevon level or at the coordinated distributed elevon and propulsion assembly level responsive to a detected fault, flight control system 20 is also operable to change the flight plan of aircraft 10 responsive to the detected fault. For example, based upon factors including the extent of the fault or faults, weather conditions, the type and criticality of the mission, the distance from mission goals and the like, flight control system 20 may command aircraft 10 to travel to a predetermined location, to perform an emergency landing or to continue the current mission.

Figure 5H:
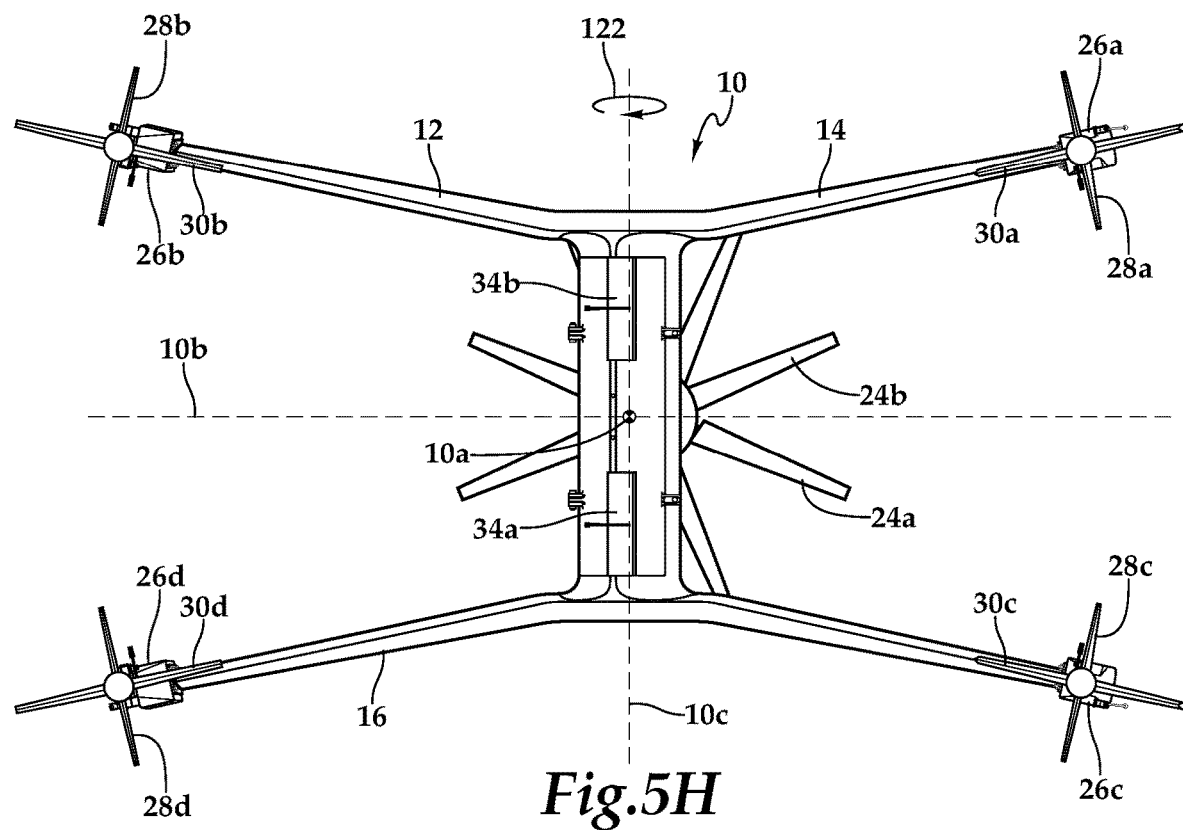
Figure 5G:
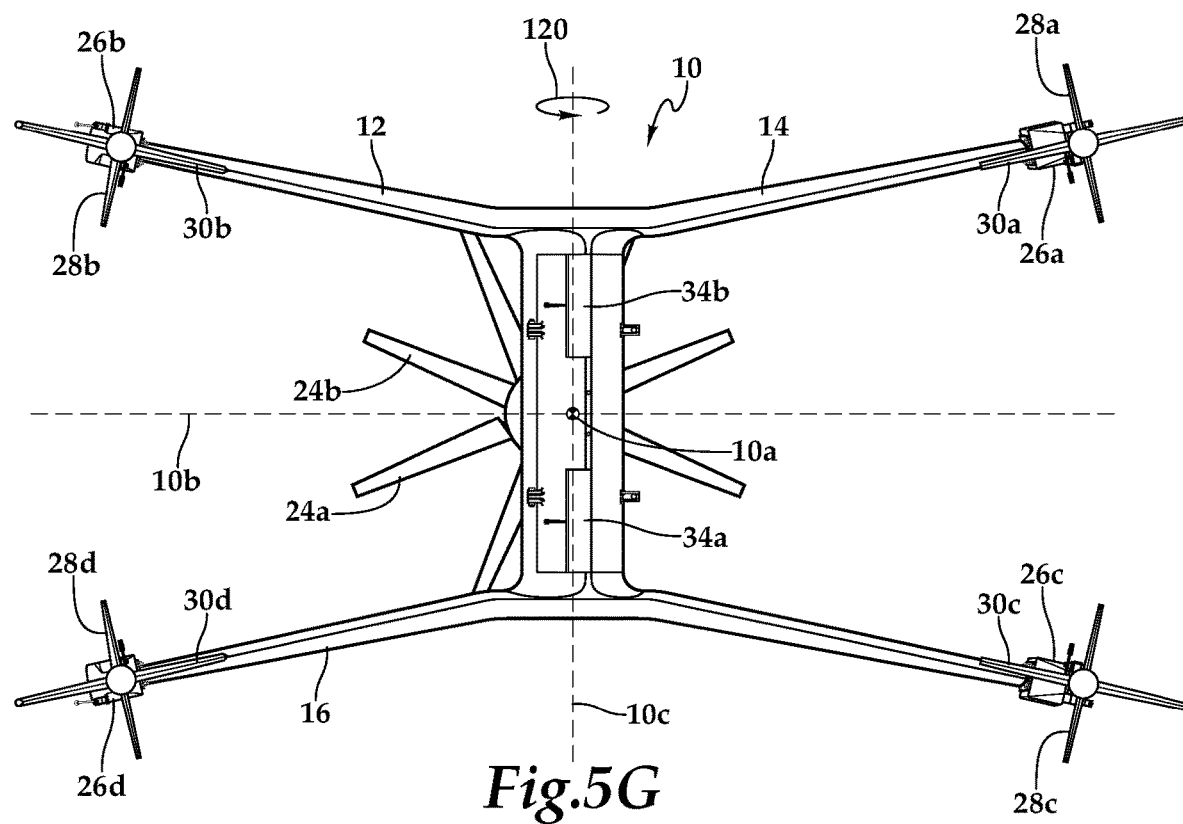

Continuing with the sequential flight-operating scenario, aircraft 10 remains in the biplane orientation with forward rotor assembly 24a and aft rotor assembly 24b generating forward thrust and with upper wing 14 and lower wing 16 generating wing-borne lift in FIG. 2E. In the biplane orientation, flight control system 20 independently controls yaw vanes 34a, 34b to provide yaw authority for aircraft 10. For example, yaw vanes 34a, 34b may be operated collectively to create yaw moments response to the airflow around fuselage 18 and across yaw vanes 34a, 34b. As best seen in FIG. 5G, when yaw vanes 34a, 34b are shifted to the left, the airflow across yaw vanes 34a, 34b creates yaw moments about the center of gravity of aircraft 10 that urge aircraft 10 to rotate about vertical axis 10c in a yaw left or counterclockwise direction, when viewed from above, as indicated by arrow 120. Similarly, as best seen in FIG. 5H, when yaw vanes 34a, 34b are shifted to the right, the airflow across yaw vanes 34a, 34b creates yaw moments about the center of gravity of aircraft 10 that urge aircraft 10 to rotate about vertical axis 10c in a yaw right or clockwise direction, when viewed from above, as indicated by arrow 122. In the illustrated embodiment, collective yaw vane positioning is achieved by operation of yaw vane actuators 94a, 94b (see FIG. 7) to shift yaw vanes 34a, 34b in the same direction relative to fuselage 18 responsive to commands from flight control system 20.

It is noted that the use of propulsion assembly 22 provides unique advantages for maintaining the airworthiness of aircraft 10 in a one engine inoperable event during forward flight. In the illustrated embodiment, forward rotor assembly 24a and aft rotor assembly 24b of coaxial rotors system 24 respectively receive torque and rotational energy from electric motors 22g, 22h (see FIG. 6). If flight control system 20 detects a fault with electric motor 22h, for example, flight control system 20 is operable to perform corrective action responsive to the detected fault including feathering the rotor blades of aft rotor assembly 24b, which is associated with inoperable motor 22h, and adjusting the collective pitch and/or rotor speed of forward rotor assembly 24a, which is driven by the operative motor 22g. As forward flight with wing-borne lift requires significantly less power than VTOL flight with thrust-borne lift, operation of a single rotor assembly coaxial rotors system 24 provides suitable thrust for continued forward flight. Landing aircraft 10 in the one engine inoperable condition is achieved by transitioning aircraft 10 to the VTOL orientation (see FIGS. 2E-2G) and then performing an autorotation and flare recovery maneuver in manned missions with onboard pilot flight control. Alternatively, in both manned and unmanned missions with autonomous flight control, landing aircraft 10 in the one engine inoperable condition is achieved by transitioning aircraft 10 to the VTOL orientation (see FIGS. 2E-2G) and then deploying a parachute to reduce the descent speed to a landing surface.

Figure 2G:
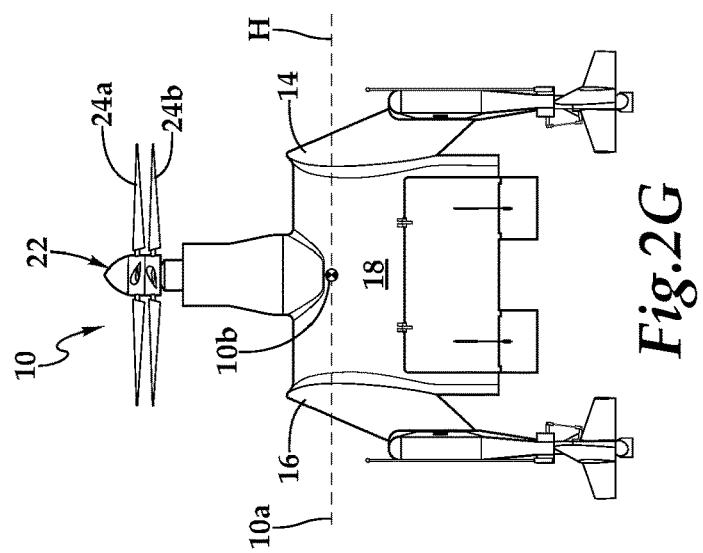
Figure 2H:
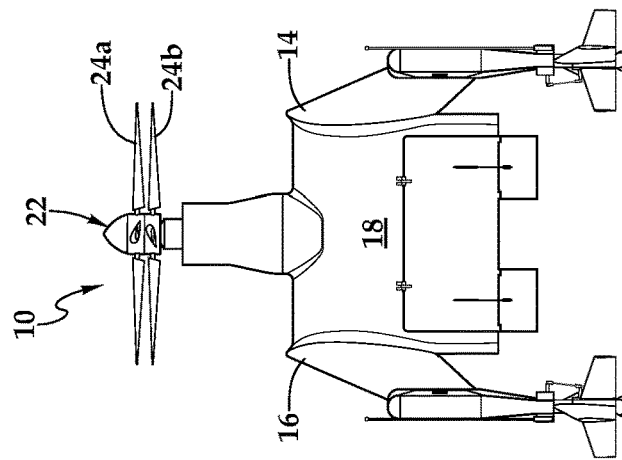
Figure 2I:
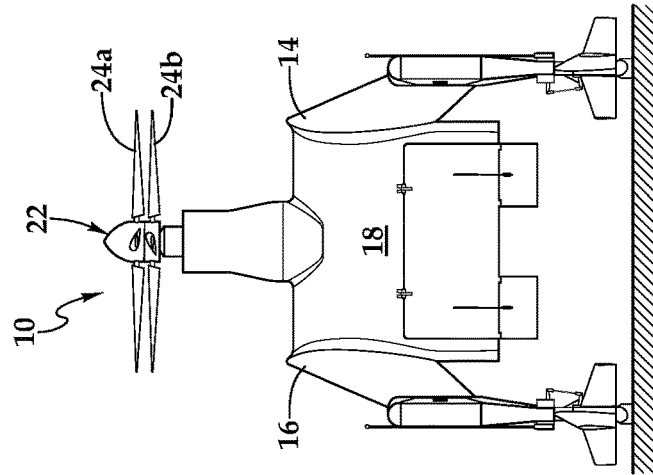

Continuing with the sequential flight-operating scenario, as aircraft 10 approaches the destination, aircraft 10 may begin the transition from wing-borne lift to thrust-borne lift. As best seen from the progression of FIGS. 2E-2G, aircraft 10 is operable to pitch up from the biplane orientation to the VTOL orientation to enable, for example, a vertical landing operation. As seen in FIG. 2F, longitudinal axis 10a extends out of the horizontal plane H such that aircraft 10 has an inclined flight attitude of about forty-five degrees pitch up. This can be achieved as discussed herein by collective operation of elevons 30, by thrust vectoring of propulsion assembly 22 or a combination thereof. As illustrated, this causes an increase in the angle of attack of wings 14, 16 such that aircraft 10 engages in a climb. In FIG. 2G, aircraft 10 has completed the transition from the biplane orientation to the VTOL orientation and, by convention, longitudinal axis 10a has been reset to be in the horizontal plane H, which also includes lateral axis 10b such that aircraft 10 has a level flight attitude in the VTOL orientation. Aircraft 10 may now commence a vertical descent to a landing surface, as best seen in FIG. 2H. As discussed above, during such VTOL operations including hover operations throughout the landing sequence, flight control system 20 may utilize thrust vectoring of propulsion assembly 22 to provide translation authority for aircraft 10 and may utilize differential rotor speed control, differential collective pitch control and/or differential yaw vane positioning to provide yaw authority for aircraft 10. As best seen in FIG. 2I, aircraft 10 has landed in a tailsitter orientation at the desired location.

Figure 3A:
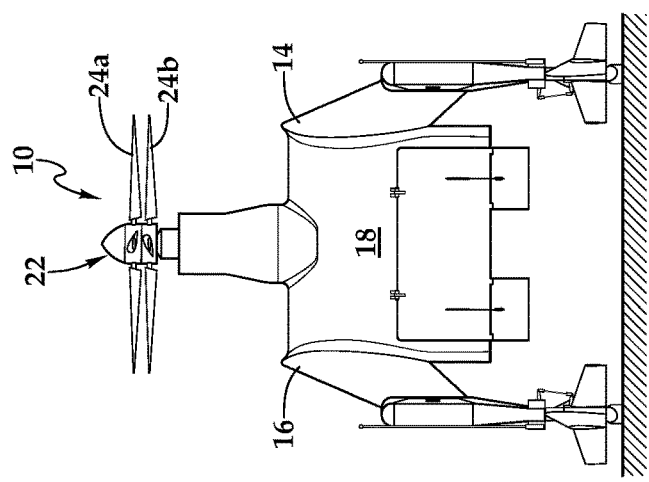
Figure 3B:
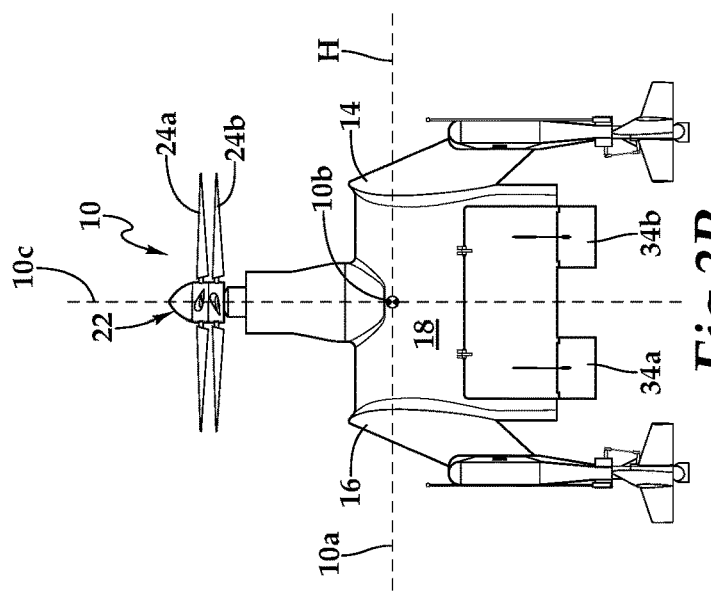

Referring now to FIGS. 3A-3F in the drawings, another sequential flight-operating scenario of aircraft 10 is depicted. As best seen in FIG. 3A, aircraft 10 is in a tailsitter position on a surface such as the ground or the deck of an aircraft carrier. When aircraft 10 is ready for a mission, flight control system 20 commences operations providing flight commands to the various systems of aircraft 10. Flight control system 20 may be operating responsive to autonomous flight control, remote flight control, onboard pilot flight control or a combination thereof. As best seen in FIG. 3B, aircraft 10 has performed a vertical takeoff and is engaged in thrust-borne lift in the VTOL orientation of aircraft 10. As illustrated, upper rotor assembly 24a and lower rotor assembly 24b are counter-rotating in generally parallel horizontal planes. As longitudinal axis 10a and lateral axis 10b are both in a horizontal plane H that is normal to the local vertical in the earth's reference frame, aircraft 10 has a level flight attitude.

Figure 3C:
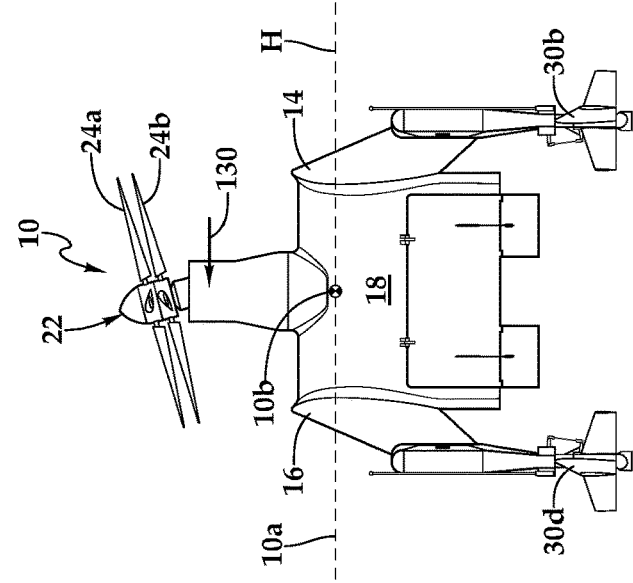

During hover, flight control system 20 may utilize speed control and/or collective pitch control of upper rotor assembly 24a and lower rotor assembly 24b to cause aircraft 10 to climb, descend or maintain a stable hover. Also during hover, flight control system 20 may utilize thrust vectoring of propulsion assembly 22 to provide translation authority for aircraft 10 and may utilize differential rotor speed control, differential collective pitch control and/or differential yaw vane positioning to provide yaw authority for aircraft 10. As best seen in FIG. 3C, aircraft 10 has completed the vertical ascent to a desired elevation and may now begin the transition from thrust-borne lift to wing-borne lift. As best seen from the progression of FIGS. 3C-3F, aircraft 10 is operable to pitch down from the VTOL orientation toward the biplane orientation to enable high speed and/or long range forward flight. As seen in FIG. 3C, aircraft 10 begins the process by tilting propulsion assembly 22 forward relative to fuselage 18 from a stable hover, instead of a climb as described above with reference to FIG. 2C. In this configuration, propulsion assembly 22 generates a thrust vector having a forward component 130 that initially causes aircraft 10 to translate in the forward direction. As the forward airspeed of aircraft 10 increases, forward thrust vector component 130 together with collective aftward tilting of elevons 30 (see FIG. 8C) urge aircraft 10 to rotate about pitch axis 10b in the pitch down direction.

As seen in FIG. 3D, longitudinal axis 10a extends out of the horizontal plane H such that aircraft 10 has an inclined flight attitude of about thirty degrees pitch down. As seen in FIG. 3E, longitudinal axis 10a extends out of the horizontal plane H such that aircraft 10 has an inclined flight attitude of about sixty degrees pitch down. As illustrated, elevons 30 are tilted aftward relative to tail assemblies 26 (see FIG. 8C) and play a progressively larger role in the pitch control of aircraft 10 as the forward speed and inclined flight attitude increase. At the same time, the tilt of propulsion assembly 22 relative to fuselage 18 is preferably being reduced. As best seen in FIG. 3F, aircraft 10 has completed the transition to the biplane orientation with forward rotor assembly 24a and aft rotor assembly 24b counter-rotating in generally parallel vertical planes. In the biplane orientation, wing 14 is above fuselage 18 and wing 16 is below fuselage 18. By convention, longitudinal axis 10a has been reset to be in the horizontal plane H, which also includes lateral axis 10b, such that aircraft 10 has a level flight attitude in the biplane orientation. In the biplane orientation, the independent control provided by flight control system 20 over elevons 30 and yaw vanes 34a, 34b provides pitch, roll and yaw authority for aircraft 10 which may be enhanced or complemented with thrust vectoring of propulsion assembly 22. Thus, aircraft 10 is operable to transition from thrust-borne lift to wing-borne lift taking advantage of the airspeed established in a climb, as discussed with reference to FIGS. 2A-2E and is also operable to transition from thrust-borne lift to wing-borne lift taking advantage of the unique thrust vectoring capability of propulsion assembly 22 to generate forward speed, as discussed with reference to FIGS. 3A-3F.

Figure 9A:
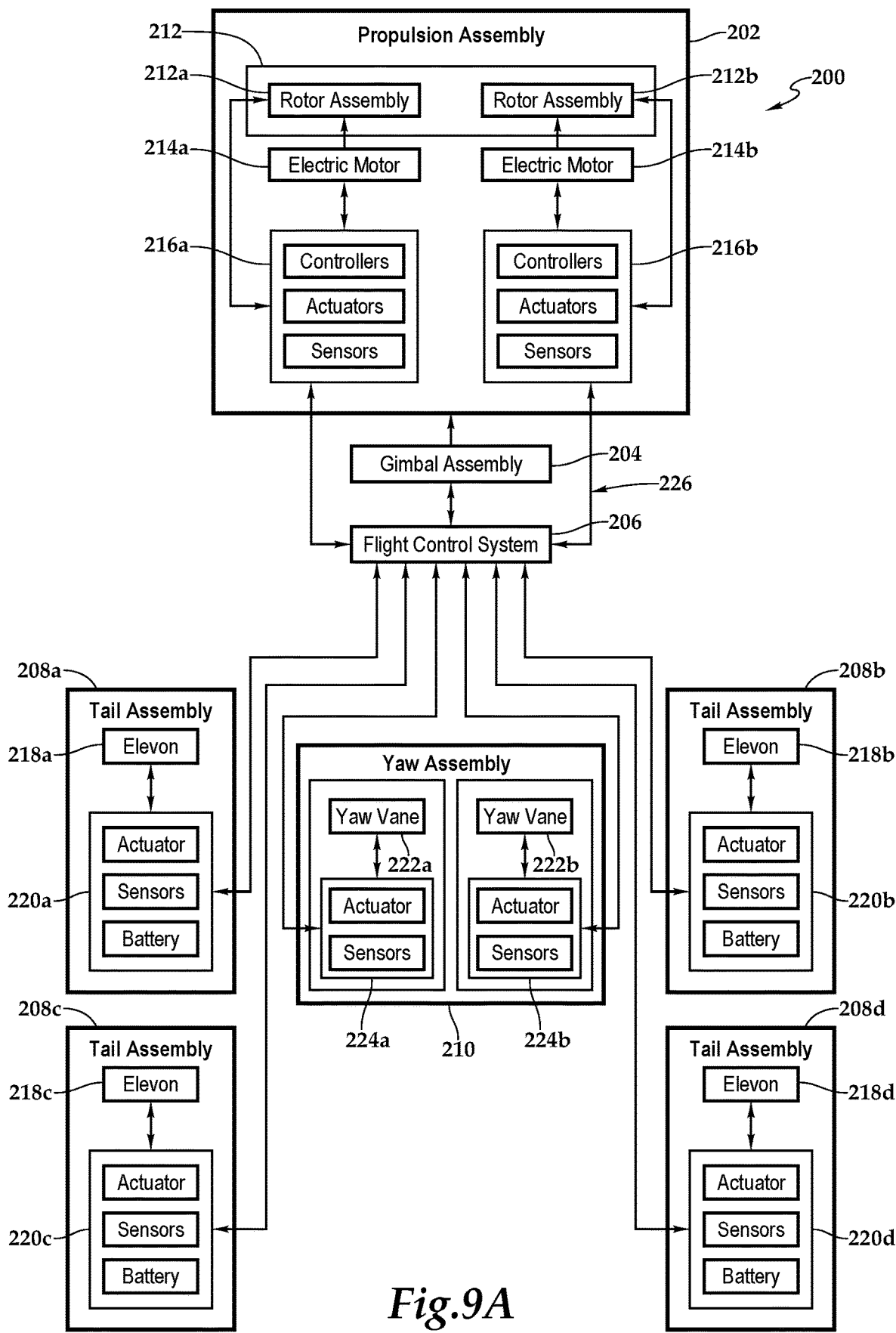
FIG. 9A is a systems diagram of one implementation of a tailsitting biplane aircraft having a coaxial rotor system in accordance with embodiments of the present disclosure.

Referring next to FIG. 9A in the drawings, a systems diagram of an aircraft 200 is depicted. Aircraft 200 is representative of aircraft 10 discussed herein. Aircraft 200 includes a propulsion assembly 202, a gimbal assembly 204, a flight control system 206, four tail assemblies 208a, 208b, 208c, 208d and a yaw assembly 210. Propulsion assembly 202 includes a counter-rotating coaxial rotor system 212 formed from rotor assembly 212a and rotor assembly 212b. Rotor assembly 212a is operably associated with an electric motor 214a and one or more controllers, actuators and/or sensors that are generally designated as electronic systems 216a, which may specifically include an electronic speed controller, a collective pitch actuator, a health monitoring sensor and the like. Similarly, rotor assembly 212b is operably associated with an electric motor 214b and one or more controllers, actuators and/or sensors that are generally designated as electronic systems 216b. Propulsion assembly 202 is configured for omnidirectional thrust vectoring. In the illustrated embodiment, propulsion assembly 202 including rotor assembly 212a, rotor assembly 212b, electric motor 214a and electric motor 214b are tilted relative to the fuselage of aircraft 200 by gimbal assembly 204.

Tail assembly 208a includes an elevon 218a that is operably associated with one or more actuators, sensors and/or batteries that are generally designated as electronic systems 220a. Tail assembly 208b includes an elevon 218b that is operably associated with one or more actuators, sensors and/or batteries that are generally designated as electronic systems 220b. Tail assembly 208c includes an elevon 218c that is operably associated with one or more actuators, sensors and/or batteries that are generally designated as electronic systems 220c. Tail assembly 208d includes an elevon 218d that is operably associated with one or more actuators, sensors and/or batteries that are generally designated as electronic systems 220d. Yaw assembly 210 includes yaw vane 222a and yaw vane 222b. Yaw vane 222a is operably associated with one or more actuators and/or sensors that are generally designated as electronic systems 224a. Yaw vane 222b is operably associated with one or more actuators and/or sensors that are generally designated as electronic systems 224b.

Flight control system 206 is operably associated with propulsion assembly 202, gimbal assembly 204, tail assemblies 208a, 208b, 208c, 208d and yaw assembly 210. In particular, flight control system 206 is linked to electronic systems 216a, 216b, 220a, 220b, 220c, 220d, 224a, 224b by a fly-by-wire communications network depicted as arrows 226. Flight control system 206 receives sensor data from and sends commands to propulsion assembly 202, gimbal assembly 204, tail assemblies 208a, 208b, 208c, 208d and yaw assembly 210 as well as other controlled systems to enable flight control system 206 to independently control each such system of aircraft 200.

Figure 9B:
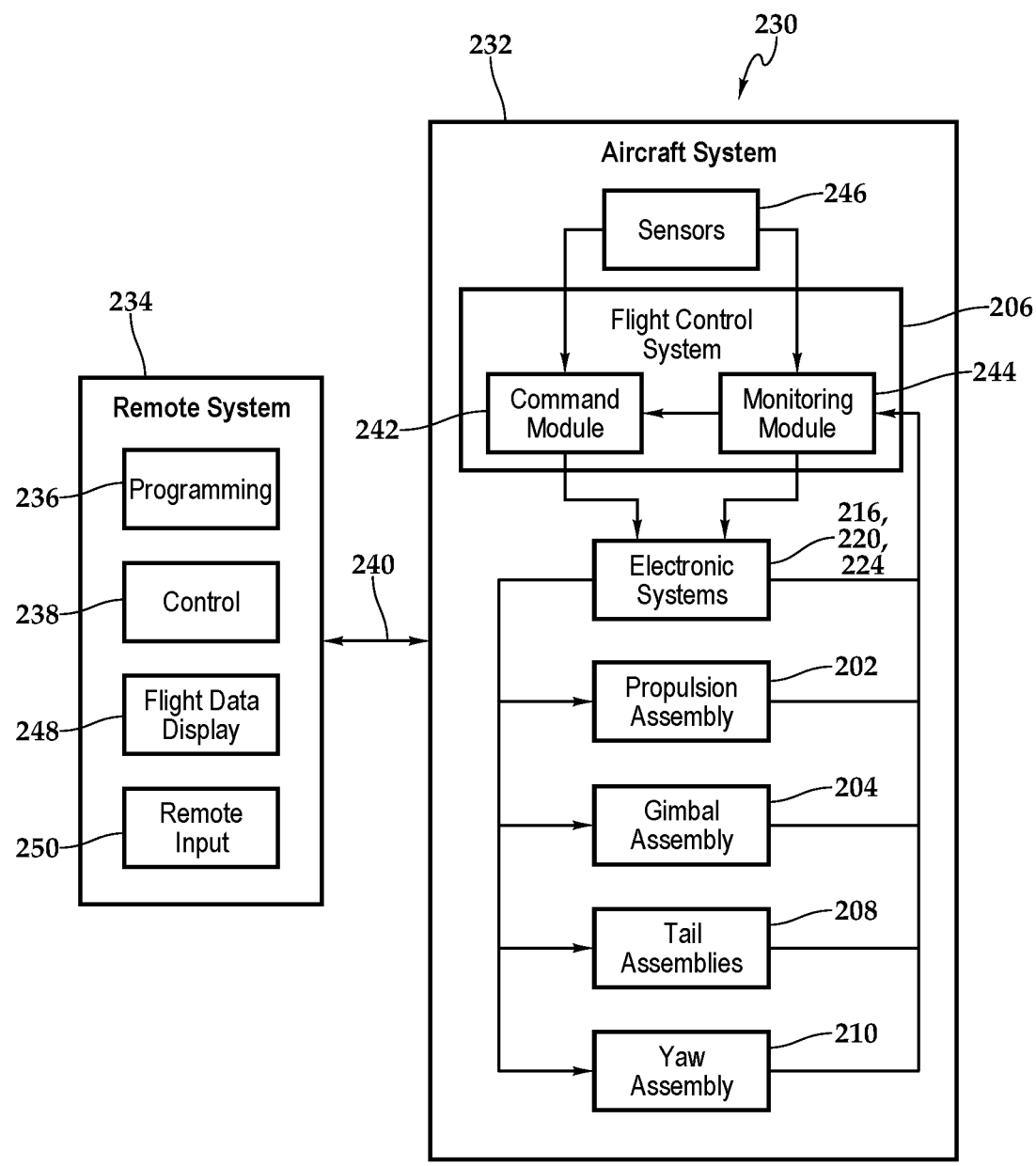
FIG. 9B is a block diagram of autonomous and remote control systems for a tailsitting biplane aircraft having a coaxial rotor system in accordance with embodiments of the present disclosure.

Referring additionally to FIG. 9B in the drawings, a block diagram depicts a control system 230 operable for use with aircraft 200 or aircraft 10 of the present disclosure. In the illustrated embodiment, system 230 includes two primary computer based subsystems; namely, an aircraft system 232 and a remote system 234. In the illustrated implementation, remote system 234 includes a programming application 236 and a remote control application 238. Programming application 236 enables a user to provide a flight plan and mission information to aircraft 200 such that flight control system 206 may engage in autonomous control over aircraft 200. For example, programming application 236 may communicate with flight control system 206 over a wired or wireless communication channel 240 to provide a flight plan including, for example, a starting point, a trail of waypoints and an ending point such that flight control system 206 may use waypoint navigation during the mission. In addition, programming application 236 may provide one or more tasks to flight control system 206 for aircraft 200 to accomplish during a mission. Following programming, aircraft 200 may operate autonomously responsive to commands generated by flight control system 206.

In the illustrated embodiment, flight control system 206 includes a command module 242 and a monitoring module 244. It is to be understood by those having ordinary skill in the art that these and other modules executed by flight control system 206 may be implemented in a variety of forms including hardware, software, firmware, special purpose processors and combinations thereof. Flight control system 206 receives input from a variety of sources including internal sources such as sensors 246, electronic systems 216, 220, 224, propulsion assembly 202, gimbal assembly 204, tail assemblies 208 and yaw assembly 210 as well as external sources such as remote system 234, global positioning system satellites or other location positioning systems and the like. For example, as discussed herein, flight control system 206 may receive a flight plan for a mission from remote system 234. Thereafter, flight control system 206 may be operable to autonomously control all aspects of flight of an aircraft of the present disclosure.

For example, during the various operating modes of aircraft 200 including vertical takeoff and landing flight mode, hover flight mode, forward flight mode and transitions therebetween, command module 242 provides commands to electronic systems 216, 220, 224. These commands enable independent operation of each of propulsion assembly 202, gimbal assembly 204, tail assemblies 208 and yaw assembly 210. Flight control system 206 also receives feedback from electronic systems 216, 220, 224. This feedback is processed by monitoring module 244 that can supply correction data and other information to command module 242 and/or electronic systems 216, 220, 224. Sensors 246, such as an attitude and heading reference system (AHRS) with solid-state or microelectromechanical systems (MEMS) gyroscopes, accelerometers and magnetometers as well as other sensors including positioning sensors, speed sensors, environmental sensors, fuel sensors, temperature sensors, location sensors and the like also provide information to flight control system 206 to further enhance autonomous control capabilities.

Some or all of the autonomous control capability of flight control system 206 can be augmented or supplanted by remote flight control from, for example, remote system 234. While operating remote control application 238, remote system 234 is configured to display information relating to one or more aircraft of the present disclosure on one or more flight data display devices 248. Display devices 248 may be configured in any suitable form, including, for example, liquid crystal displays, light emitting diode displays or any suitable type of display. Remote system 234 may also include audio output and input devices such as a microphone, speakers and/or an audio port allowing an operator to communicate with other remote control operators, a base station, an onboard pilot, crew or passengers on aircraft 200. The display device 248 may also serve as a remote input device 250 if a touch screen display implementation is used, however, other remote input devices, such as a keyboard or joystick, may alternatively be used to allow an operator to provide control commands to an aircraft being operated responsive to remote control.

Figure 10B:
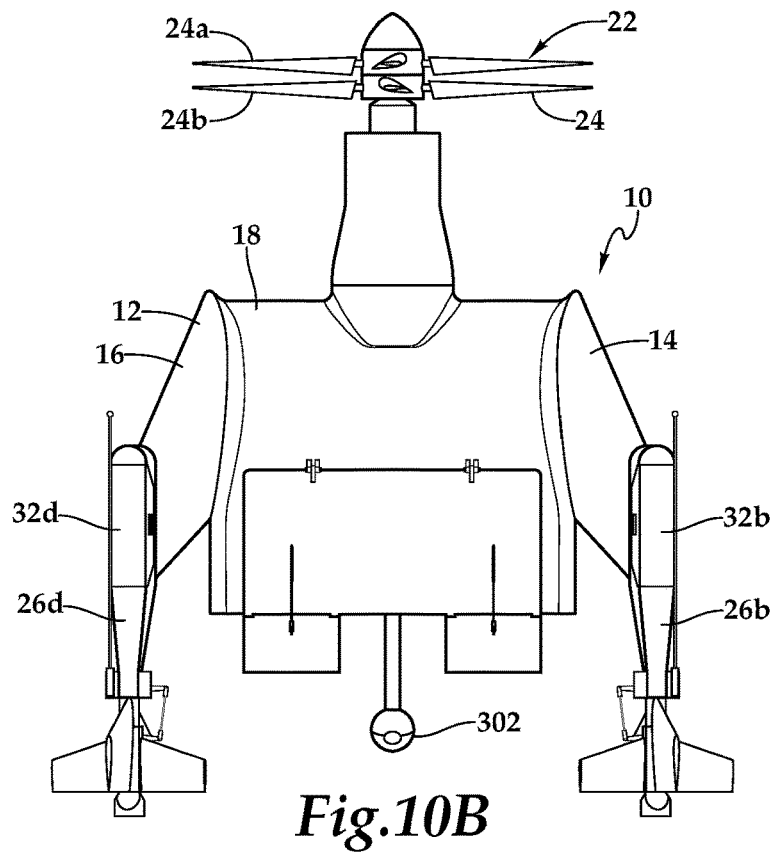
FIGS. 10A-10D are schematic illustrations of a tailsitting biplane aircraft having a coaxial rotor system in various roles in accordance with embodiments of the present disclosure.
Figure 10A:
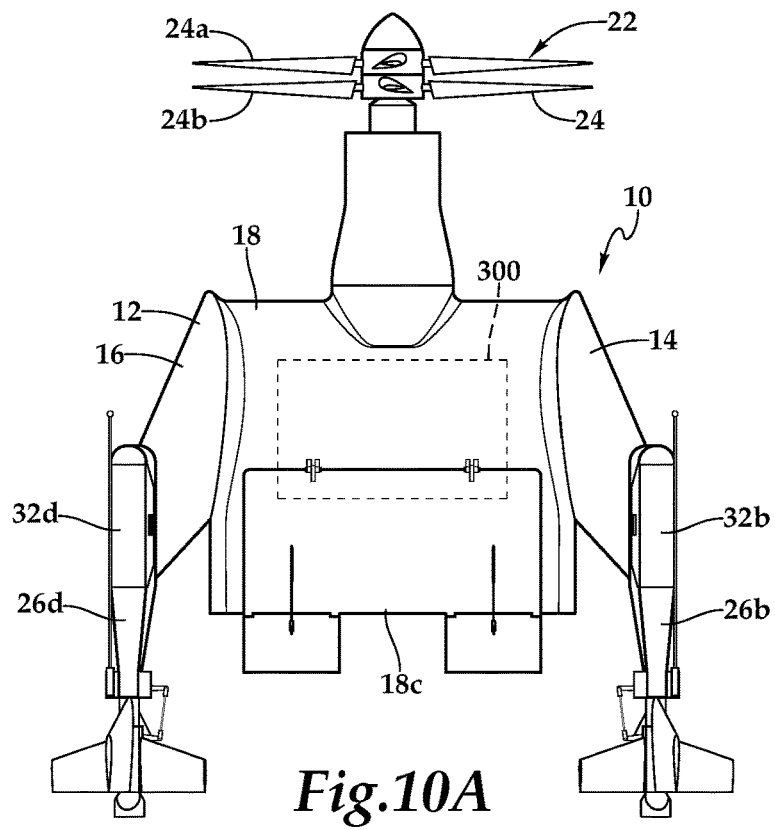

As discussed herein, aircraft 10 may be a manned or unmanned aircraft and may operate in many roles including military, commercial, scientific and recreational roles, to name a few. For example, as best seen in FIG. 10A, aircraft 10 may be a logistics support aircraft configured for cargo transportation. In the illustrated implementation, aircraft 10 is depicted as carrying a single package 300 within fuselage 18. In other implementations, the cargo may be composed of any number of packages or other items that can be carried within fuselage 18. Preferably, the cargo is fixably coupled within fuselage 18 by suitable means to prevent relative movement therebetween, thus protecting the cargo from damage and maintaining a stable center of mass for aircraft 10. In the illustrated implementation, the cargo may be insertable into and removable from fuselage 18 via aft door 18c to enable sequential cargo pickup, transportation and delivery operations to and from multiple locations. In one example, aircraft 10 may provide package delivery operations from a warehouse to customers. In another example, aircraft 10 may transport weapons or other military hardware to personnel in a military theater.

Aircraft 10 may have remote release capabilities in association with cargo transportation. For example, this feature allows aircraft 10 to deliver cargo to a desired location following transportation thereof without the requirement for landing. For example, upon reaching the desired location in a package delivery operation and transitioned from the biplane orientation to the VTOL orientation, flight control system 20 may cause aft door 18c to open such that the cargo can be released from aircraft 10. This feature may also be useful for cargo drop operations to provide food, water, medicine or other critical items to remote regions during humanitarian or disaster relief missions. Alternatively, as best seen in FIG. 10B, the delivery or pickup of cargo may be accomplished using a cargo hook module 302 that may include a cargo hoisting device disposed within fuselage 18 that is operable to raise and lower the cargo while aircraft 10 engages in a stable hover or while aircraft 10 rests in a tailsitting position on a surface. As another alternative, cargo hook module 302 may represent a cargo hook on a fixed length sling assembly that is operable to suspend the cargo a desired distance from the aft end of aircraft 10 during pickup, transportation and drop off of the cargo.

Figure 10D:
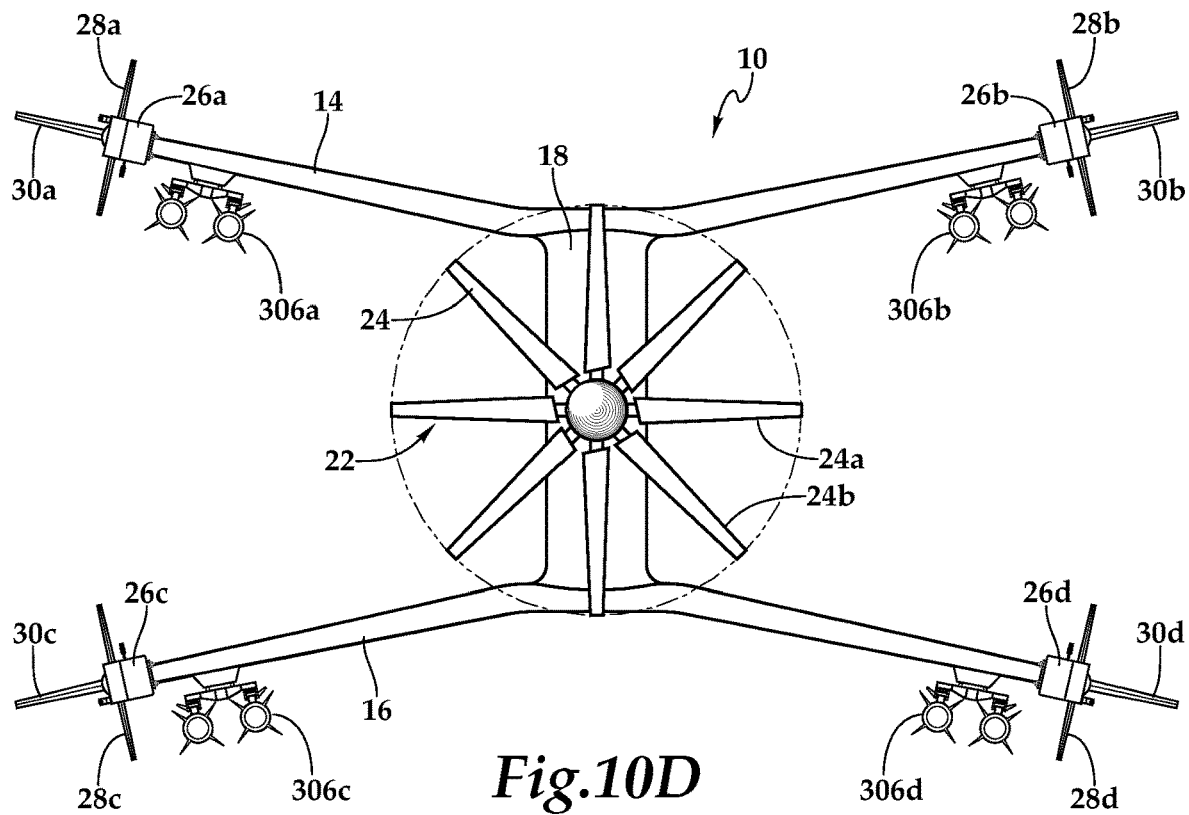
Figure 10C:
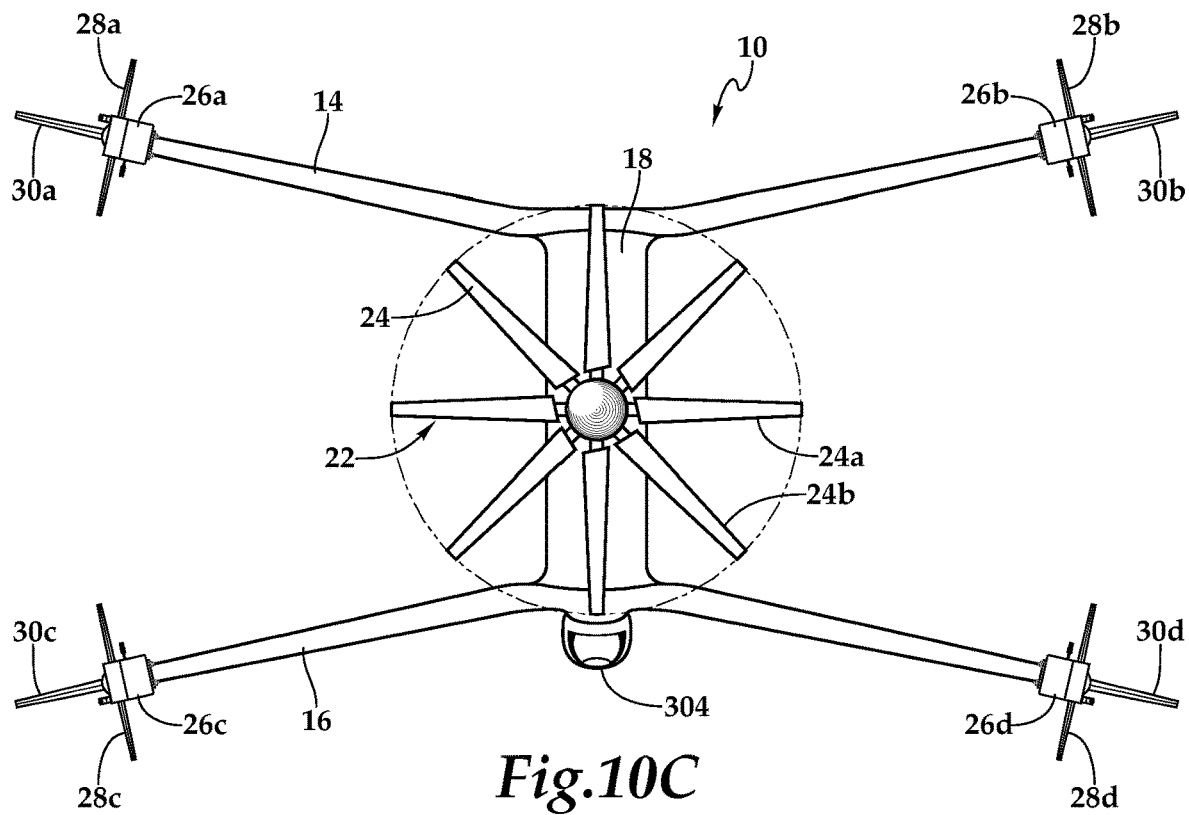

As best seen in FIG. 10C, aircraft 10 may include a turret mounted sensor assembly 304 that operates one or more sensors such as an integrated sensor suite. For example, sensor assembly 304 may include one or more of an infrared sensor such as a forward-looking infrared (FLIR) sensor, a night vision sensor or other optical sensor, a laser sensor, a lidar sensor, a sound sensor, a motion sensor, a high resolution camera, a radar, a multispectral sensor or any other type of sensor. When aircraft 10 is configured with sensor assembly 304, aircraft 10 may perform a variety of missions including aerial photography, search and rescue missions, inspection of utility lines and pipelines, environment monitoring, border patrol missions, forest fire detection and monitoring, accident investigation and crowd monitoring, to name a few. In addition, aircraft 10 may engage in military operations such as intelligence, surveillance, target acquisition and reconnaissance. Alternatively, as best seen in FIG. 10D, aircraft 10 may be configured to engage in attack missions. In the illustrated implementation, aircraft 10 has a weapons array including four under-wing mounted air-to-ground missile systems 306a, 306b, 306c, 306d such as Hellfire or JAGM missile systems. In other implementations, the weapons array of aircraft 10 could include air-to-air missile systems, such as AIM-9 Sidewinder missile systems, and/or anti-submarine torpedo systems such as MK50 torpedo systems.

Figure 11B:
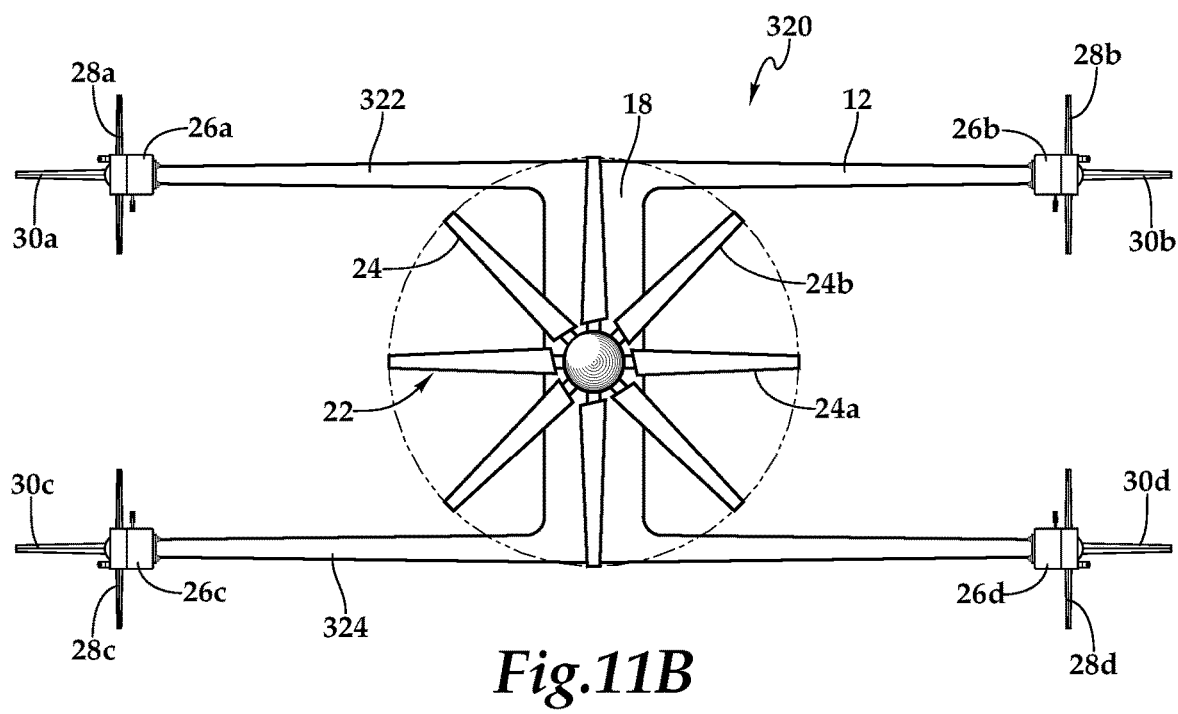
FIGS. 11A-11D are schematic illustrations of various tailsitting biplane aircraft having a coaxial rotor system in accordance with embodiments of the present disclosure.
Figure 11A:
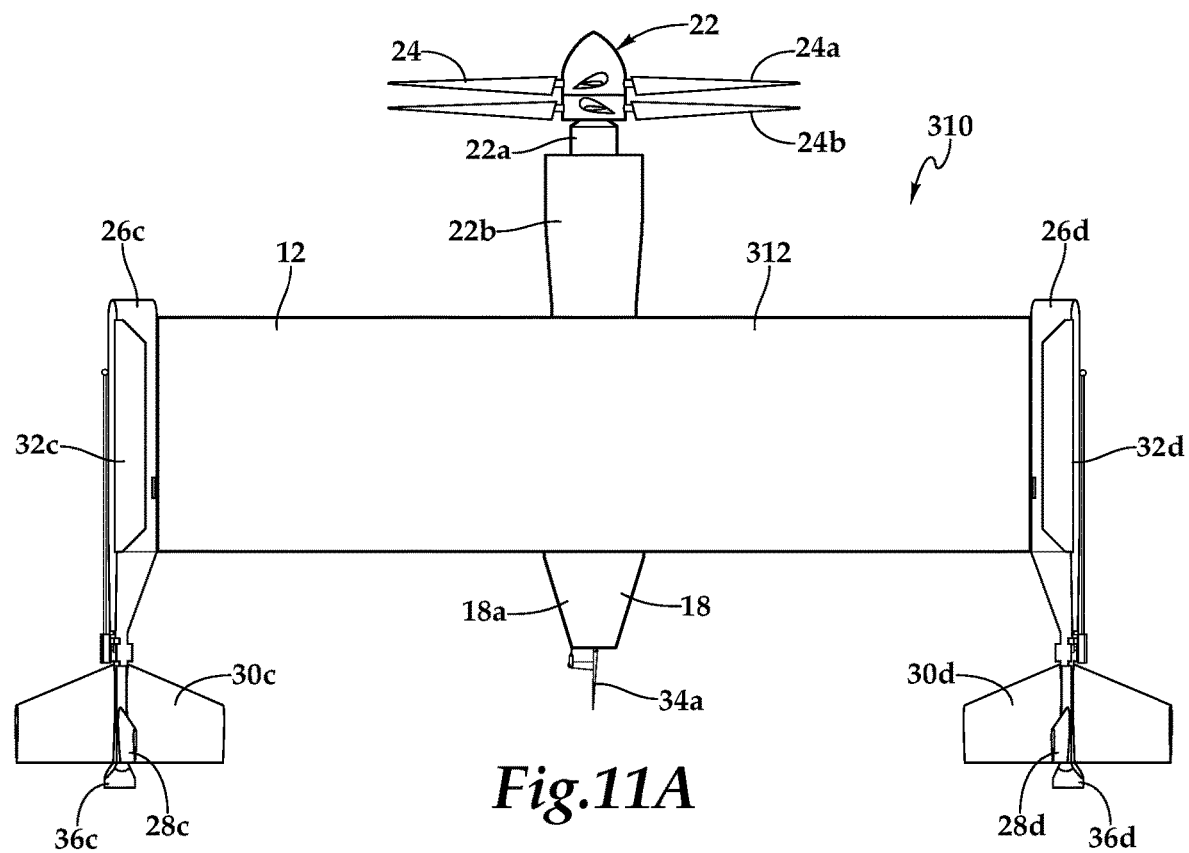
Figure 11D:
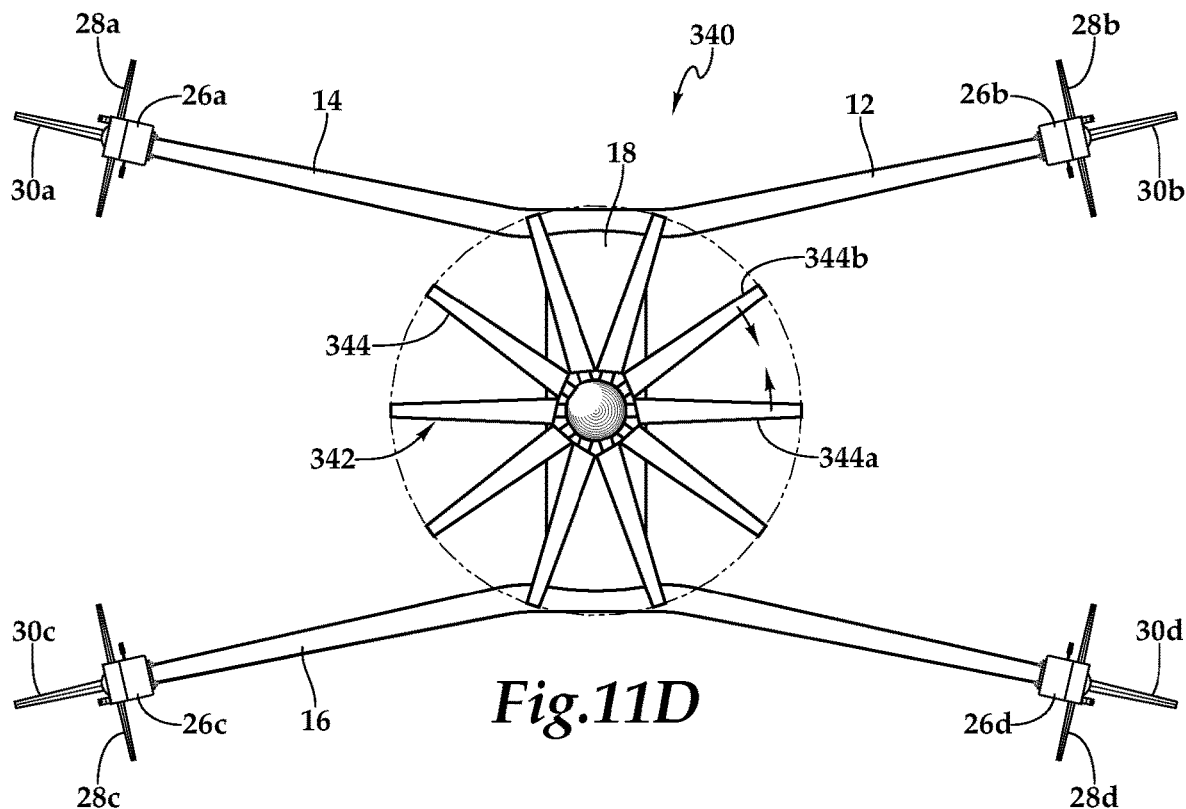
Figure 11C:
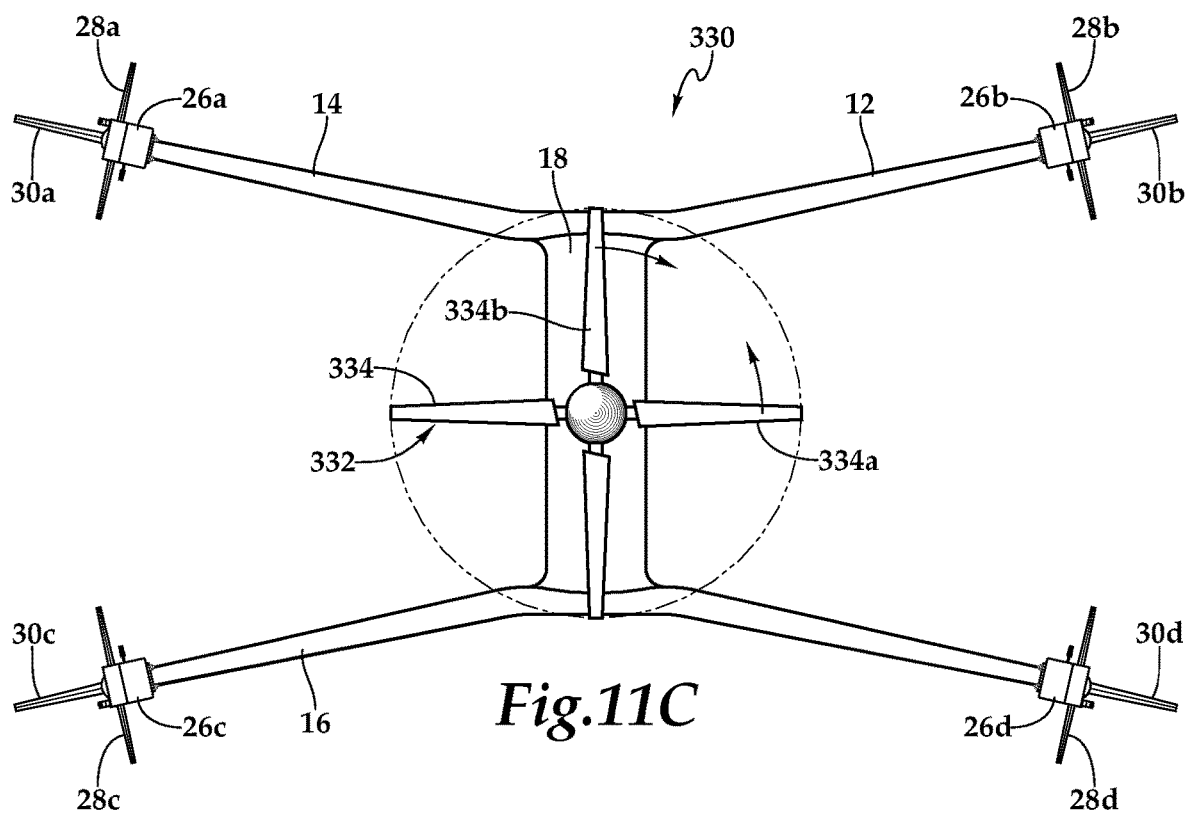

Even though aircraft 10 has been depicted and described herein as having particular attributes, it should be understood by those having ordinary skill in the art that an aircraft could have alternate structure without departing from the principles of the present disclosure. For example, aircraft 310 depicted in FIG. 11A shares many common features with aircraft 10 as indicated by the common numbering of common parts. Aircraft 310, however, has straight wings, only wing 312 being visible, instead of the swept wings 14, 16 of aircraft 10. Similarly, aircraft 320 depicted in FIG. 11B shares many common features with aircraft 10 as indicated by the common numbering of common parts. Aircraft 320, however, has flat wings 322, 324, instead of dihedral wing 14 and anhedral wing 16 of aircraft 10. As another example, aircraft 330 depicted in FIG. 11C shares many common features with aircraft 10 as indicated by the common numbering of common parts. Aircraft 330, however, has a propulsion assembly 332 that includes a counter-rotating coaxial rotor system 334 formed from rotor assembly 334a and rotor assembly 334b, each of which has two rotor blades instead of four rotor blades as in the rotor assemblies of aircraft 10. Similarly, aircraft 340 depicted in FIG. 11D shares many common features with aircraft 10 as indicated by the common numbering of common parts. Aircraft 340, however, has a propulsion assembly 342 that includes a counter-rotating coaxial rotor system 344 formed from rotor assembly 344a and rotor assembly 344b, each of which has five rotor blades instead of four rotor blades as in the rotor assemblies of aircraft 10.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft operable to transition between thrust-borne lift in a VTOL orientation and wing-borne lift in a biplane orientation, the aircraft comprising:
    an airframe including a first wing, a second wing and a fuselage that extends between the first and second wings;
    a propulsion assembly coupled to the fuselage, the propulsion assembly including a counter-rotating coaxial rotor system that is tiltable relative to the fuselage to generate a thrust vector;
    first and second yaw vanes extending aftwardly from the fuselage, the first and second yaw vanes configured to differentially provide yaw authority for the aircraft in the VTOL orientation and collectively provide yaw authority for the aircraft in the biplane orientation; and
    a flight control system configured to direct the thrust vector of the counter-rotating coaxial rotor system and control movements of the first and second yaw vanes;
    wherein, in the VTOL orientation, the first wing is forward of the fuselage, the second wing is aft of the fuselage and the counter-rotating coaxial rotor system is configured to provide thrust in line with a yaw axis of the aircraft; and
    wherein, in the biplane orientation, the first wing is below the fuselage, the second wing is above the fuselage and the counter-rotating coaxial rotor system is configured to provide thrust in line with a roll axis of the aircraft.

2. The aircraft as recited in claim 1 wherein, in the biplane orientation, the first wing has an anhedral configuration and the second wing has a dihedral configuration.

3. The aircraft as recited in claim 1 wherein the first and second wings are swept wings.

4. The aircraft as recited in claim 1 wherein the fuselage has a length in a longitudinal direction and each of the first and second wings has a wingspan; and
    wherein, the ratio of the length to the wingspan is between 1 to 2 and 1 to 3.

5. The aircraft as recited in claim 1 wherein the counter-rotating coaxial rotor system further comprises first and second rotor assemblies each having at least four rotor blades.

6. The aircraft as recited in claim 5 wherein the at least four rotor blades of the first rotor assembly and the at least four rotor blades of the second rotor assembly each has a root to tip twist between forty degrees and fifty degrees.

7. The aircraft as recited in claim 5 wherein each of the first and second rotor assemblies has a diameter and each of the first and second wings has a wingspan; and
    wherein, the ratio of the diameter to the wingspan is between 1 to 1 and 1 to 3.

8. The aircraft as recited in claim 1 wherein the propulsion assembly further comprises a motor assembly including at least one electric motor.

9. The aircraft as recited in claim 1 further comprising a gimbal assembly coupled between the counter-rotating coaxial rotor system to the fuselage, the gimbal assembly having first and second pivot axes configured for tilting the counter-rotating coaxial rotor system relative to the fuselage.

10. The aircraft as recited in claim 9 wherein the first and second pivot axes further comprise orthogonal pivot axes.

11. The aircraft as recited in claim 9 wherein the first and second pivot axes further comprise a pitch pivot axis and a lateral pivot axis.

12. The aircraft as recited in claim 9 wherein the gimbal assembly includes an inner gimbal ring coupled to the counter-rotating coaxial rotor system, an outer gimbal ring coupled to the inner gimbal ring, an inner gimbal ring actuator configured to tilt the inner gimbal ring about the first pivot axis and an outer gimbal ring actuator configured to tilt the outer gimbal ring about the second pivot axis; and
    wherein, the flight control system is configured to control the inner and outer gimbal ring actuators.

13. The aircraft as recited in claim 1 wherein, in the VTOL orientation, the aircraft has translation authority responsive to the thrust vector.

14. The aircraft as recited in claim 1 wherein the aircraft is configured to convert from the VTOL orientation to the biplane orientation responsive to the thrust vector having a pitch forward component during a climb.

15. The aircraft as recited in claim 1 wherein the aircraft is configured to convert from the VTOL orientation to the biplane orientation responsive to the thrust vector having a pitch forward component during forward translation above a predetermined airspeed.

16. The aircraft as recited in claim 1 wherein each of the first and second wings further comprises wingtips; and wherein, the aircraft further comprises a plurality of tail assemblies, each of which is coupled to one of the wingtips and includes a vertical stabilizer and an elevon, the elevons forming a distributed array of elevons that is configured to collectively provide pitch authority and differentially provide roll authority for the aircraft in the biplane orientation.

17. The aircraft as recited in claim 16 further comprising a plurality of batteries and wherein, each of the batteries is coupled to one of the plurality of tail assemblies.

18. The aircraft as recited in claim 16 wherein the counter-rotating coaxial rotor system defines a rotor disk that is positioned inboard of the plurality of tail assemblies.

19. An aircraft operable to transition between thrust-borne lift in a VTOL orientation and wing-borne lift in a biplane orientation, the aircraft comprising:
- an airframe including a first wing having wingtips, a second wing having wingtips and a fuselage that extends between the first and second wings;
- a propulsion assembly gimbal mounted relative to the fuselage, the propulsion assembly including a counter-rotating coaxial rotor system that is tiltable relative to the fuselage about first and second pivot axes to generate a thrust vector;
- first and second yaw vanes extending aftwardly from the fuselage, the first and second yaw vanes configured to differentially provide yaw authority for the aircraft in the VTOL orientation and collectively provide yaw authority for the aircraft in the biplane orientation;
- a plurality of tail assemblies, each of which is coupled to one of the wingtips and includes a vertical stabilizer and an elevon, the elevons forming a distributed array of elevons that is configured to collectively provide pitch authority and differentially provide roll authority for the aircraft in the biplane orientation; and
- a flight control system configured to direct the thrust vector of the counter-rotating coaxial rotor system and control movements of the first and second yaw vanes and the elevons;
- wherein, in the VTOL orientation, the first wing is forward of the fuselage, the second wing is aft of the fuselage and the counter-rotating coaxial rotor system is configured to provide thrust in line with a yaw axis of the aircraft; and
- wherein, in the biplane orientation, the first wing is below the fuselage, the second wing is above the fuselage and the counter-rotating coaxial rotor system is configured to provide thrust in line with a roll axis of the aircraft.

\* \* \* \* \*